US012323272B2

(12) United States Patent
Chen

(10) Patent No.: US 12,323,272 B2
(45) Date of Patent: Jun. 3, 2025

(54) PRIVATE MATTER GATEWAY CONNECTION MECHANISM FOR USE IN A PRIVATE COMMUNICATION ARCHITECTURE

(71) Applicant: Primes Lab Inc., San Jose, CA (US)

(72) Inventor: Ben Wei Chen, Santa Ana, CA (US)

(73) Assignee: Primes Lab Inc., San Jose, CA (US)

( * ) Notice: Subject to any disclaimer, the term of this patent is extended or adjusted under 35 U.S.C. 154(b) by 395 days.

(21) Appl. No.: 17/992,945

(22) Filed: Nov. 23, 2022

(65) Prior Publication Data

US 2023/0083939 A1    Mar. 16, 2023

Related U.S. Application Data

(63) Continuation-in-part of application No. 17/736,103, filed on May 4, 2022, now Pat. No. 12,143,365, which is a continuation-in-part of application No. 17/229,156, filed on Apr. 13, 2021, now Pat. No. 11,863,529, which is a continuation-in-part of application No. 17/174,841, filed on Feb. 12, 2021, now Pat. No. 11,683,292, which is a
(Continued)

(51) Int. Cl.
*H04L 12/46*    (2006.01)
*G06F 9/455*    (2018.01)
*H04L 9/40*    (2022.01)

(52) U.S. Cl.
CPC ...... *H04L 12/4641* (2013.01); *G06F 9/45558* (2013.01); *H04L 63/0272* (2013.01); *H04L 63/10* (2013.01); *G06F 2009/45595* (2013.01)

(58) Field of Classification Search
CPC . H04L 12/4641; H04L 63/0272; H04L 63/10; G06F 9/45558; G06F 2009/45595
See application file for complete search history.

(56) References Cited

U.S. PATENT DOCUMENTS 6,499,053 B1    12/2002  Marquette
7,096,495 B1    8/2006   Warrier
(Continued)

FOREIGN PATENT DOCUMENTS

KR    10-2021-0015570 A    2/2021
TW    201635164 A    10/2016
(Continued)

OTHER PUBLICATIONS

Oskar Rosén, Encrypted Chat Client: Encrypted communication over XMPP, KTH Royal Institute of Technology, Sweden 2015,2015.
(Continued)

*Primary Examiner* — Blake J Rubin
(74) *Attorney, Agent, or Firm* — Winston Hsu

(57) ABSTRACT

A method for a connection mechanism in a public cloud network is disclosed. The method includes acquiring a plurality of connection credentials from a public cloud portal (PCP) Admin Device; pairing and registration with a private cloud virtual private network (VPN) server (PCVS) from a private matter gateway (PMG); establishing a plurality of initial VPN tunnels between the PCVS and the PMG; connecting to the PMG on demand between a PCVS smart device client and the PMG through the PCVS; and running a plurality of vertical peer-to-peer (P2P) private and secure PCVS smart device client applications between at least one PCVS smart device client and one of at least one PMG smart device client, at least one PMG network service and another PCVS smart device client.

23 Claims, 16 Drawing Sheets

Related U.S. Application Data continuation-in-part of application No. 16/807,481, filed on Mar. 3, 2020, now Pat. No. 11,356,417, which is a continuation-in-part of application No. 14/741,145, filed on Jun. 16, 2015, now Pat. No. 10,601,810, which is a continuation-in-part of application No. 14/663,244, filed on Mar. 19, 2015, now Pat. No. 9,935,930, which is a continuation-in-part of application No. 14/526,393, filed on Oct. 28, 2014, now Pat. No. 9,781,087, which is a continuation-in-part of application No. 14/450,104, filed on Aug. 1, 2014, now Pat. No. 10,237,253, which is a continuation-in-part of application No. 13/229,285, filed on Sep. 9, 2011, now Pat. No. 9,203,807.

(56) References Cited

U.S. PATENT DOCUMENTS

| | | | |
|---|---|---|---|
| 8,375,421 | B1 | 2/2013 | Shigapov |
| 9,853,834 | B2 | 12/2017 | Meier |
| 10,594,502 | B1 | 3/2020 | Soroker |
| 11,265,296 | B1 | 3/2022 | Uysal |
| 11,784,976 | B1 | 10/2023 | Wei |
| 2002/0061779 | A1 | 5/2002 | Maehiro |
| 2004/0148439 | A1 | 7/2004 | Harvey |
| 2004/0218611 | A1 | 11/2004 | Kim |
| 2005/0114711 | A1 | 5/2005 | Hesselink |
| 2008/0057913 | A1 | 3/2008 | Sinha |
| 2008/0201486 | A1 | 8/2008 | Hsu |
| 2010/0064008 | A1 | 3/2010 | Yan |
| 2011/0013641 | A1 | 1/2011 | Kolhi |
| 2011/0238761 | A1 | 9/2011 | Mizokami |
| 2012/0179971 | A1 | 7/2012 | Appelman |
| 2013/0191896 | A1 | 7/2013 | Adderly |
| 2013/0227672 | A1 | 8/2013 | Ogg |
| 2013/0283364 | A1 | 10/2013 | Chang |
| 2013/0347072 | A1 | 12/2013 | Dinha |
| 2014/0280433 | A1 | 9/2014 | Messerli |
| 2014/0344720 | A1 | 11/2014 | Kumashio |
| 2015/0092603 | A1 | 4/2015 | Aguayo |
| 2015/0188888 | A1 | 7/2015 | Kang |
| 2015/0195265 | A1 | 7/2015 | Chen |
| 2015/0288678 | A1 | 10/2015 | Chen |
| 2015/0339136 | A1 | 11/2015 | Suryanarayanan |
| 2015/0381568 | A1 | 12/2015 | Johnson |
| 2016/0149839 | A1 | 5/2016 | Yi |
| 2016/0330200 | A1 | 11/2016 | Ansari |
| 2016/0352682 | A1 | 12/2016 | Chang |
| 2017/0181210 | A1 | 6/2017 | Nadella |
| 2018/0019981 | A1 | 1/2018 | Leavy |
| 2018/0255142 | A1 | 9/2018 | Benantar |
| 2018/0255591 | A1 | 9/2018 | Valicherla |
| 2019/0014038 | A1 | 1/2019 | Ritchie |
| 2019/0268423 | A1 | 8/2019 | Shah |
| 2019/0327112 | A1 | 10/2019 | Nandoori |
| 2019/0327312 | A1 | 10/2019 | Gupta |
| 2020/0099659 | A1 | 3/2020 | Cometto |
| 2020/0351254 | A1 | 11/2020 | Xiong |
| 2021/0058466 | A1 | 2/2021 | Gero |
| 2021/0075748 | A1 | 3/2021 | Agarwal |
| 2021/0218705 | A1 | 7/2021 | Polcha, Sr. |
| 2021/0234835 | A1 | 7/2021 | Chen |
| 2022/0239709 | A1 | 7/2022 | Ittelson |
| 2022/0345572 | A1 | 10/2022 | Hong |
| 2022/0393967 | A1 | 12/2022 | Solanki |
| 2023/0164113 | A1 | 5/2023 | Gupta |
| 2023/0216947 | A1 | 7/2023 | Bernardi |
| 2023/0308446 | A1 | 9/2023 | Tong |

FOREIGN PATENT DOCUMENTS

| | | |
|---|---|---|
| TW | 201701169 A | 1/2017 |
| WO | 2006/028850 A2 | 3/2006 |

OTHER PUBLICATIONS

Verizon, Cisco WebEx Meetings, Aug. 2018, https://espanol.verizon.com/business/resources/userguides/user_guide_webex_meetings_ipad_iphone.pdf ,2018.

David Isaac Wolinsky et al., Addressing the P2P bootstrap problem for small overlay networks, 2010 IEEE Tenth International Conference on Peer-to-Peer Computing (P2P), IEEE, 2010. ,2010.

Jianguo Ding et al., Management of Overlay Networks: A Survey, 2009 Third International Conference on Mobile Ubiquitous Computing, Systems, Services and Technologies, 2009 IEEE, doi: 10.1109/UBICOMM.2009.49, pp. 249~255 ,2009.

Christer Jakobsson, Peer-to-peer communication in web browsers using WebRTC, A detailed overview of WebRTC and what security and network concerns exists, 2015. ,2015.

Paul Rösler et al., More is Less: On the End-to-End Security of Group Chats in Signal, WhatsApp, and Threema, 3rd IEEE European Symposium on Security and Privacy (EuroS&P 2018), 2018.,2018.

David Isaac Wolinsky et al., On the design of autonomic, decentralized VPNs, 6th International Conference on Collaborative Computing: Networking, Applications and Worksharing (CollaborateCom 2010), IEEE Xplore, 2010 ,2010.

PRIVATE MATTER GATEWAY CONNECTION MECHANISM FOR USE IN A PRIVATE COMMUNICATION ARCHITECTURE

CROSS REFERENCE TO RELATED APPLICATIONS

This application is a continuation-in-part of U.S. application Ser. No. 17/736,103, filed on May 4, 2022, which is a continuation-in-part of U.S. application Ser. No. 17/229,156, filed on Apr. 13, 2021, which is a continuation-in-part of U.S. application Ser. No. 17/174,841, filed on Feb. 12, 2021, which is a continuation-in-part of U.S. application Ser. No. 16/807,481, filed on Mar. 3, 2020, which is a continuation-in-part of U.S. application Ser. No. 14/741,145, filed on Jun. 16, 2015, which is a continuation-in-part of U.S. application Ser. No. 14/663,244, filed on Mar. 19, 2015, which is a continuation-in-part of U.S. application Ser. No. 14/526,393, filed on Oct. 28, 2014, which is a continuation-in-part of U.S. application Ser. No. 14/450,104, filed on Aug. 1, 2014, which is a continuation-in-part of U.S. application Ser. No. 13/229,285, filed on Sep. 9, 2011. The contents of these applications are incorporated herein by reference.

BACKGROUND OF THE INVENTION

1. Field of the Invention

The present invention relates generally to networking and more particularly to the use of private cloud networks.

2. Description of the Prior Art

In the Internet connected environment, the Smart Device Clients including smart phone, tablet, eBook reader, notebook, PC and various smart gadgets are ubiquitous and omnipresent. Other than connectivity, one of the values of the Smart Device Clients is to be able to connect at any time and anyplace to acquire services from one or many serving parties or servers. The services include audio, video contents, live or archived information, and execution of applications, social media, messaging, email, storage, backup, calendar, contact, synchronization, sharing, remote desktop, Internet of Things (IoT) and others. Other services include real-time private and secure video, audio, text and application communication between at least two Smart Device Clients. There are different types of servers that serve these various requests from the Smart Device Clients. In general, these types of servers can be categorized to fall into two groups: a public cloud and a private cloud. Servers in the public cloud, implied by the name "public", provide services that tend to be free with limited functionality or fee-based with more sophisticated services and interact with the public. Examples of the public cloud server include data center, social media services and storage/content provider through the Internet. On the other hand, servers in the private cloud tend to address the private need. The services provided are more private and personal as opposed to those offered by the public cloud.

One example of the application of the private cloud server (PCS) is a private cloud storage server (PCSS). The PCSS sits within the local area network (LAN) managed by the user. It provides on-line and backup storage for the user either within the LAN or in the wide area network (WAN). The user is able to use a Smart Device Client to access information within the PCSS at anytime from anywhere. The PCSS and the associated Smart Device Client therefore form an example of the PCS and a Client architecture.

Conventionally, there are many storage server solutions, including network attached storage (NAS), Windows/Mac/Linux server, and direct attached storage (DAS) to fulfill the PCSS requirement. But the challenge for the Smart Device Clients in the field has been how to avoid the cumbersome setup to penetrate the firewall behind the router on the LAN to access the PCSS in a home or office environment. There are at least four kinds of solutions to this challenge.

One solution is to assign a fixed Internet Protocol (IP) address and open certain ports for the router in front of the PCSS, such that the Smart Device Client is able to locate the PCSS from outside the LAN and to authenticate itself, penetrate the firewall and establish a secure communication channel with the PCSS.

A second solution applies when a fixed IP address is not available. The user configures the LAN router of the PCSS and opens certain ports to map to the PCSS. The router is therefore able to be located by the intended Smart Device Client through a dynamic domain name service (DDNS) service on the WAN. The Smart Device Client can authenticate itself, penetrate the firewall and establish a secure communication channel with the PCSS.

A third solution is to rely on another routing server in the WAN to conduct the virtual private network (VPN) communication between the Smart Device Client and the PCSS. The VPN communication allows the Smart Device Client to locate the PCSS, authenticate itself, penetrate the firewall and establish a secure communication channel with the PCSS.

A fourth solution is to rely on another routing server in the WAN to conduct the remote desktop protocol (RDP) or virtual network computing (VNC) communication between the Smart Device Client and the PCSS. The RDP/VNC communication allows the Smart Device Client to locate the PCSS, authenticate itself, penetrate the firewall and establish a secure communication channel with the PCSS. Other solutions can be mix-and match of the above-mentioned solutions.

In a first scenario, a fixed IP address is required and the router needs to be set up and configured. The down side is that a fixed IP involves more cost and is usually not available in the home and small business environment. The router set up and configuration can be very complicated and are not user friendly with most consumers.

In a second scenario, a DDNS service is required and the router needs yet more complex set up. Again, the DDNS set up involves additional cost and complexity into the system. The router set up and configuration can be very complicated and is not user friendly with most consumers.

In a third and fourth scenarios, an outside routing server or service needs to be established, while a router set up is not necessary. The outside routing server or service controls and handles login/authentication between the Smart Device Client and the server. The private cloud becomes less private and less secure through the public cloud-based server or service. If for any reason the server or service is down, the communication and availability of the PCSS will be jeopardized.

All of these scenarios require technical expertise that may be suitable for conventional corporate environment, but these scenarios are not suitable for consumer oriented Smart Device Client centric deployment.

In most conventional systems, an outside or public cloud-based routing server is used by the Smart Device Client during access to a Private Cloud Service. Using an outside server creates a number of concerns to the Smart Device Client owner.

First, the sense of trust is always in question, because the outside or public cloud-based routing server is a middleman during all communication transactions between the Smart Device Client and the Private Cloud Service. It may hold all user account info, password and their corresponding IP addresses of the Smart Device Client and the Private Cloud Service. The routing server is able to sniff any communication in-between and render it insecure.

Second, being an outside and public cloud-based routing server, the business model of the owner of server may not always be in-line or in-sync with the Smart Device Client owner. If the routing server is out of service due to any business reason, there is no remedy or option of replacement to restore the service. The routing server potentially poses a tremendous business risk to the user as the vital link in the communication can be broken without recourse.

Conventionally, in the case of communication between two Smart Device Clients, both parties need to sign into a public cloud-based server in order to conduct real-time video, audio, text or application communication. The privacy and security are easily compromised due to the fact that the communication has to go through a public cloud-based server, as outlined above.

In addition, the IoT devices which are the building blocks of the smart appliances at home, have been plagued by the fragmentation of various standards from Matter, Apple HomeKit, Google Nest, Amazon Alexa, and many others. Due to the interoperability, compatibility, as well as the privacy and security issues of the IoT devices, the adoption rate of the smart appliances at home has been below expectation.

Accordingly, what is needed is a system and method that addresses the above identified issues. The present invention addresses such a need.

SUMMARY OF THE INVENTION

A method for use with a public cloud network is disclosed. The method includes setting up at least one public cloud portal (PCP), at least one virtual machine server (VMS), at least one PCP Admin Device, at least one private cloud virtual private network (VPN) server (PCVS), at least one VPN tunnel, and at least one PCVS smart device client on the side of the PCVS to provide cloud-based web services, and at least one private metaverse (PM) which includes at least one private router, at least one private local area network (LAN), at least one private matter gateway (PMG), at least one PMG Admin Device, at least one private network service (PNS), and at least one PMG smart device client on the side of the PMG private LAN in a client server relationship. The PCVS smart device client, such as a smart phone, tablet, notebook, or Tesla dashboard operates in the public cloud, while a PMG smart device client, such as a notebook (NB), Internet of Things (IoT) device, network attached storage (NAS), set-top-box (STB), smart appliance, or media server, resides on the private and secure LAN. The present invention is based on a decentralized peer-to-peer (P2P) communication architecture to provide to the users with access convenience as well as privacy and security at the same time. The at least one PCP and the at least one VMS which includes PCVS, usually reside in a hyperscale data center located on a public cloud network, while the at least one PM along with PMG and the at least one PMG smart device client or network service reside in the client's remote premises. The private cloud VPN server relays communication between the PCVS smart device client on the side of the PCVS and the PMG. The PCVS will call back the PMG on demand based on the PCVS smart device client request. The at least one VPN tunnels are enabled and established between the PCVS and PMG. The at least one VPN tunnels are enabled and established between the PCVS and PCVS smart device client. The two VPN tunnels are channeled into one single VPN tunnel between the PCVS smart device client and the PMG through the PCVS. All communication from this point onwards between the PCVS smart device client and the PMG through the PCVS is secure and private. All PMG smart device clients along with the network services on the private LAN of the PM are available for access in the LAN mode for future VPN connection from the PCVS smart device clients. From this point on, the PMG and the PCVS are in standby mode waiting for future access from the PCVS smart device clients in the public cloud from Internet.

The at least one PCP is initially accessed by the at least one PCVS client to log in and acquire the connection credentials including the PCVS server passcode, the VMS domain name, the PCVS VPN client profile file, and the PCVS VPN client passcode. The PCVS VPN client profile file and the PCVS VPN client passcode can then be sent to any authorized PCVS client for future access. With these two credentials, the authorized PCVS client can then connect through the PCP to the targeted VMS and in turn to the corresponding PCVS. Once connected, the first VPN tunnel between the PCVS client and the PCVS is enabled. The at least one PMG in the private LAN of the PM, will enable a third VPN tunnel on demand with the at least one PCVS in the public cloud as soon as (or if) the proper credentials are established. The at least one PCVS in the public cloud will in turn call back the at least one PMG in the private LAN to enable a first VPN tunnel. The at least one PMG in the private LAN of the PM, will in turn establish a first VPN tunnel with the at least one PCVS in the public cloud as soon as (or if) the first VPN tunnel is enabled by PCVS. A second VPN channel is also enabled by the PCVS for the at least one PCVS smart device client. The at least one PCVS smart device client starts request for connection to the at least one PCVS through the PCVS VPN client profile to establish a third VPN tunnel on demand, in case that the at least one PCVS smart device client intends to access to any PMG smart device client or a PNS on the private LAN of the PM. The at least one PCVS in the public cloud will in turn call back the at least one PMG in the private LAN of the PM, to establish a third VPN tunnel on demand, and relay communication between the PCVS smart device client from the Internet and the PMG residing on the private LAN of the PM. The second VPN tunnel on demand and the third VPN tunnel on demand are channeled into one single VPN tunnel between the PCVS smart device client and the PMG through the PCVS. From this point onwards, all communication between the PCVS smart device client and the PMG through the PCVS is secure and private. All PMG smart device clients along with the network services on the private LAN of the PM are available for access in the LAN mode for future VPN connection from the PCVS smart device clients. Both the PMG and the PCVS are in standby mode waiting for future access from the PCVS smart device clients in the public cloud from Internet.

In summary, the present invention sets up at least one PCVS in a client server relationship with at least one PMG. The at least one PCVS and the at least one PMG privately and securely communicates with each other through the public cloud network. It sets up the at least one PCVS smart device client in a client server relationship with the at least one PCVS. It sets up at least one PMG smart device client and at least one PMG PNS in a client server relationship with the at least one PMG. It sets up at least one PCVS smart device client in a client server relationship with the at least one PMG. The at least one PCVS smart device client and the at least one PMG communicates with each other through the public cloud network. The at least one PCVS smart device client and the at least one PMG smart device client privately and securely communicates with each other through the public cloud network. The at least one PCVS smart device client and the at least one PMG PNS privately and securely communicates with each other through the public cloud network.

The VPN tunnels are based on the industry standard that guarantee privacy and security, as well as future proof interoperability and compatibility in communication. All PMG clients, including IoT devices, along with the network services on the private LAN are thus available for access in the LAN mode, from the PCVS client thought VPN connection in a private and secure manner. Unlike the prior art, which is dependent on the cloud mode access of the clients or the IoT devices on the private LAN through a cloud-based relay server, the present invention relies solely on the LAN mode access through the VPN channels. The access content itself is never and cannot be monitored or recorded due to the strength of the industry recognized VPN tunnel, The present invention is therefore much more private and secure in access communication compared with those of offered by most other prior art. The network connection is based on the Internet protocol. The solution is therefore platform agnostic and simultaneously compatible with all existing fragmented IoT device platforms, be it Matter, Apple HomeKit, Google Nest, or Amazon Alexa, as long as the IoT devices are LAN discoverable and networkable. The term "platform" is interchangeable with the term "ecosystem" through the text. For further consideration of security, the connection credentials including the PCVS server passcode, the VMS domain name, the PCVS VPN client profile file, and the PCVS VPN client passcode, can all be revoked and re-issued per the request of the admin account of the PCVS clients from the cloud through Internet.

The present invention requires the future PMG clients, i.e., the IoT devices, to operate in LAN mode, instead of in cloud mode, in order to achieve absolute privacy and security for the users. By doing so, the IoT devices no longer need to provide their own cloud-based relay server. The consequential benefits to the users are:
  a. Breaking up the monopoly in app and IoT device access from mobile operating system (OS) providers like Apple and Google;
  b. Access convenience from anywhere in the world through Internet;
  c. True access privacy and security;
  d. Interoperability and compatibility with Matter, Apple HomeKit, Google Nest, and Amazon Alexa, at the same time;
  e. Lowering the entry barrier in IoT device manufacturing, as no more cloud-based relay server is required from the IoT manufacturers;
  f. Re-instilling confidence in consumers to spur future IoT device sales;
  g. Opening up new vertical app for IoT markets in secure chat, audio, and video and others; and
  h. Future proof implementation, based on the industry Internet protocol in network and communication access.

For the purpose of accessing one PMG smart device client, or IoT device at home from another PCVS smart device client anywhere in the world, the present invention maintains the benefits of access convenience, ease of deployment, great privacy and security, full compatibility/interoperability, and high performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
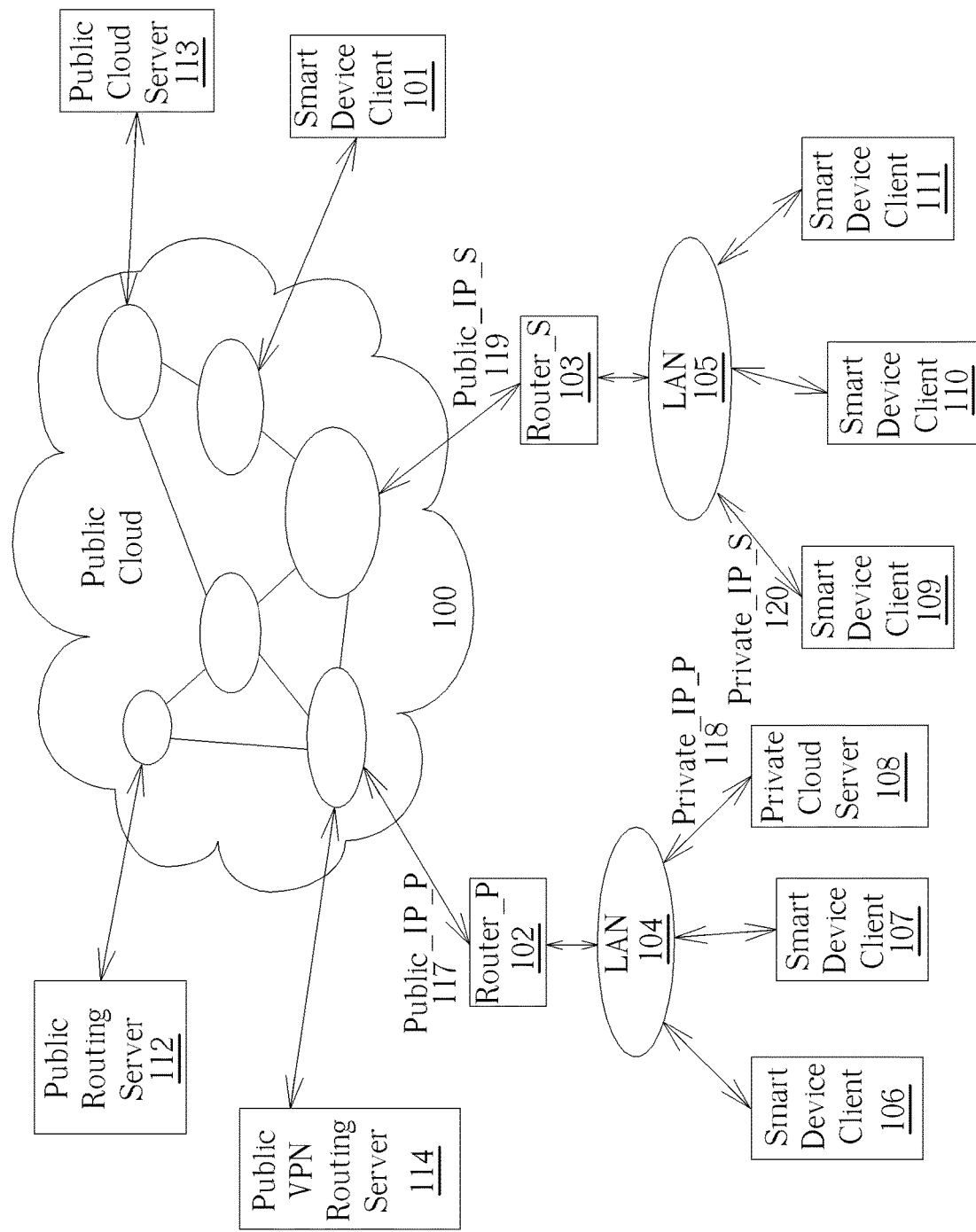
FIG. 1 is a block diagram of a conventional Cloud Network Infrastructure.

The present invention relates generally to networking and more particularly to the use of private cloud networks. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

The term "Client" is interchangeable with "Smart Device Client" throughout discussion in the context. The term "router" is in general interchangeable with "gateway", "access point" and/or "NAT" (network address translation) in the discussion.

A system and method in accordance with the present invention addresses the following challenges in a consumer-oriented environment for a Smart Device Client in a wide area network (WAN) to be able to obtain services from a Private Cloud Storage Server (PCSS) or any Private Cloud Server (PCS):
1. Access the PCS at anytime from anywhere.
2. Access the PCS behind the firewall with fixed or dynamic Internet Protocol (IP) address.
3. Require no public cloud-based routing server in the WAN.
4. Require no additional router setup in a local area network (LAN).
5. Authenticate with the PCS.
6. Establish a secure communication channel with the PCS.

If such challenges can be met and resolved, the deployment of the PCS or service will increase exponentially, due to plug and play simplicity and availability. The technical and business concern will also be removed by not utilizing a public cloud-based routing server. The PCS being utilized for storage, remote desktop service and Internet of Things (IoT) becomes very affordable and ubiquitous in the private cloud infrastructure.

In the private cloud environment, if there are more than one PCSs or services co-existing at the same time, it is advantageous to separate out the functions of PCS into two functional blocks including a Private Cloud Routing Service (PRS) and a Private Network Service (PNS). The PNS is designed to be managed and accessed on the private network environment, be it wired or wireless, by the Smart Device Client. Examples of a PNS include application program server to provide remote desktop protocol (RDP), VNC, office tools, media player, and other user specific applications. The PNS may also function as a storage server that contains multiple terabytes of storage serving the private cloud. Functions of the PRS of the multiple Private Matter Gateways (PMGs) can then be aggregated together into just one PMG. The PMG can generally be referred to as a Private Cloud Router.

A system and method in accordance with the present invention addresses the following challenges in the consumer-oriented environment for utilizing the Smart Device Client in the WAN to be able to manage and access the PNS from a PMG:
1. Access the PMG at anytime from anywhere.
2. Access the PMG behind the firewall with fixed or dynamic IP address.
3. Require no outside or public cloud-based routing server in the WAN.
4. Require no additional router setup in the LAN.
5. Authenticate with the PMG.
6. Establish a secure communication channel with the PNS to manage and access.

If the PMG can fulfill the above-mentioned challenges, heterogeneous PCSs from different manufacturers and vendors can then be broken down into simpler PNSs and remove the complexity of private cloud setup, configuration and access.

The purpose of a system and method in accordance with the invention is to provide a PMG, the PNS and Client architecture without utilizing a routing server. The system and method in accordance with the present invention addresses the above identified challenges that to allow a Client to be able to access the PNS from anywhere at anytime. The system and method also access the PNS behind a firewall with fixed or dynamic IP, requires no additional router setup and no public cloud-based routing server in the WAN, to authenticate with the PMG, and to establish a secure communication channel directly with the PNS.

As shown in FIG. 1, a cloud network infrastructure includes a public cloud 100, a public cloud server 113, a public routing server 112, a public virtual private network (VPN) routing server 114, a Smart Device Client 101 in the WAN, a Router_P 102 and a Router_S 103. The Router_S 103 connects between a LAN 105 and the Internet in the public cloud 100. The Router_P 102 connects between a LAN 104 and the Internet in the public cloud 100. Behind the LAN 104, there are Smart Device Clients 106, 107 and a PCS 108. Behind the LAN 105, there are Smart Device Clients 109, 110 and 111. The Smart Device Client can be a PC, notebook, tablet, Tesla dashboard, smart phone, eBook reader, GPS, smart TV, set top box, MP3 player, or any networkable embedded device.

The Smart Device Clients are denoted in the Cloud Network Infrastructure as 101, 106, 107, 109, 110, and 111. Any one of the Smart Device Clients above is interchangeable in the context and discussion. The focus on this discussion is the Smart Device Client 109, as the representative in this context.

Physically, there are three scenarios that a Smart Device Client 101, 107 or 109 can connect to the PCS 108. First, a Smart Device Client 107 determines whether the target is in the locally accessible LAN 104 and decides to connect to the PCS 108 directly. Second, the Smart Device Client 101 determines the target is not in the locally accessible LAN 104 and decides to connect through the WAN to the public cloud 100. The WAN locates the Router_P 102 and the LAN 104, and then connects to the PCS 108. Third, the Smart Device Client 109 determines the target is not in the locally accessible LAN 105 and decides to passes through the LAN 105, Router_S 103, and connects to the public cloud 100 in the WAN.

The Smart Device Client 109 then locates the Router_P 102, the LAN 104 and connects to the PCS 108. The first and the second scenario are two special cases and derivatives of the third scenario. Therefore, it is beneficial to focus on the third scenario that is broader in scope and complexity.

Figure 2:
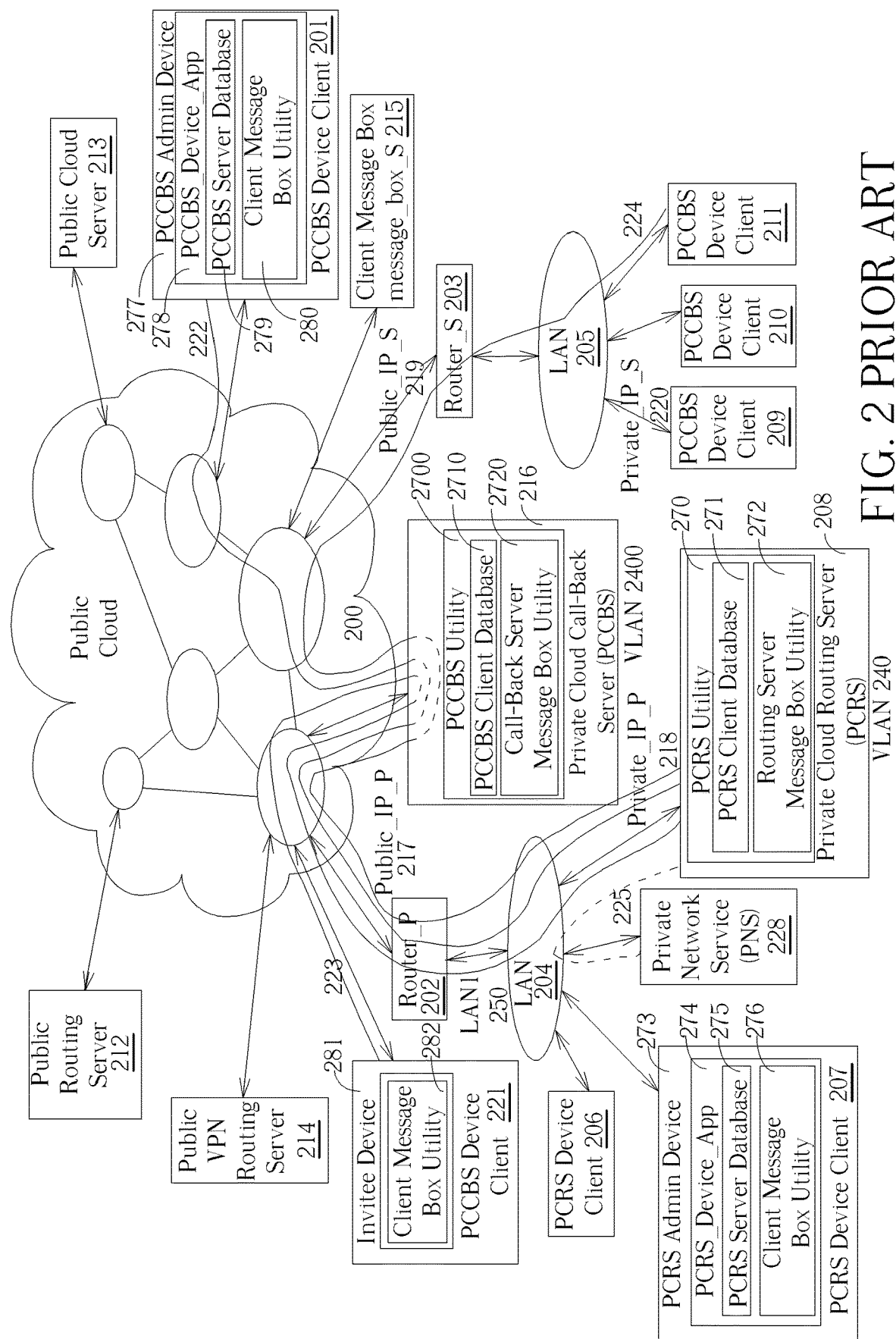
FIG. 2 is a block diagram of a Cloud Network Infrastructure for the connection mechanism based on session-based message box communication among the Private Cloud Routing Server, the PCCBS, the PNS, the PCRS smart device client, and the PCCBS smart device client.

As shown in FIG. 2, a cloud network infrastructure includes a public cloud 200, a public cloud server 213, a public routing server 212, a public VPN routing server 214, a PCCBS Smart Device Client 201 in the WAN, a Router_P 202 and a Router_S 203. The Router_S 203 connects between a LAN 205 and the Internet in the public cloud 200. The routing server message box (not shown) or a Client Message Box message_box_S 215 can be hosted inside an email server, text message server, web server, or any kind of server that can host secure message for information exchange between the Private Cloud Routing Server (PCRS) 208, and the Private Cloud Call-Back Server (PCCBS) 216, as a server, the PCRS smart device client 206, 207, and the PCCBS smart device client 209, 210, 211, 201, 221, as a client. The Call-Back Server Message Box (not shown) or Client Message Box message_box_S 215, is accessible and under the secure and private control of either PCRS 208, and the PCCBS 216, as a server, or the PCRS smart device client 206, 207, and the PCCBS smart device client 209, 210, 211, 201, 221, as a client. The security and business model of the message box is well understood and expected in the industry by the user. For any reason either message box is down, it can be replaced or redeployed immediately without jeopardizing the communication between the server and the client in the private cloud infrastructure.

Figure 3:
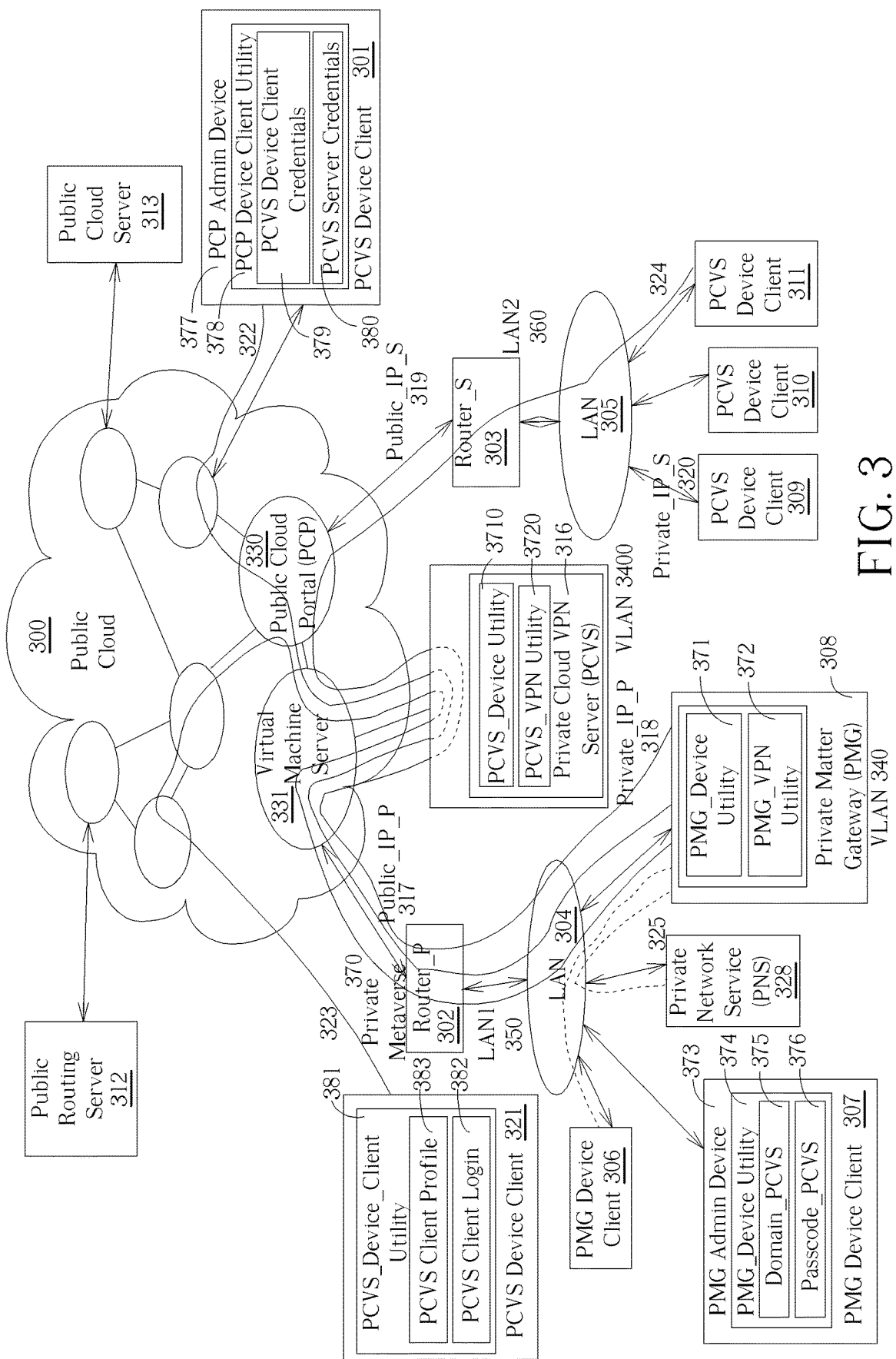
FIG. 3 is a block diagram of a first embodiment of a Cloud Network Infrastructure for the connection mechanism based on channeling multiple VPN tunnels among the PMG, the Private Cloud VPN Server, the PNS, the PMG smart device client, and the PCVS smart device client in accordance with the present invention.

FIG. 3 shows a block diagram of a first embodiment of a Cloud Network Infrastructure for a secure connection mechanism among the PMG, the Private Cloud VPN Server, the PMG Smart Device Clients, and the private cloud VPN server (PCVS) Smart Device Clients for the exploring and accessing of PNS across the public cloud. There are five phases in the connection mechanism between a PCVS Device Client in the cloud, and a PMG Device Client on the private LAN. The five phases are:

Phase one, acquiring connection credentials from a public cloud portal (PCP) Admin Device;

Phase two, pairing and registration with a PCVS from a PMG;

Phase three, establishing initial VPN tunnels between the PCVS and the PMG;

Phase four, connecting to the PMG on demand between the PCVS smart device client and the PMG through the PCVS; and Phase five, running vertical peer-to-peer (P2P) private and secure PCVS smart device client applications between at least one PCVS smart device client and at least one PMG smart device client, at least one PMG network service, or yet another PCVS smart device client.

In Phase one: acquiring the connection credentials from the PCP Admin Device: To start with, a PCP Admin Device 377, which is itself a PCVS device client 301, logins to a PCP Device Utility (not shown) of a PCP 330 to acquire PCVS Device Client Credentials 379 and PCVS Server Credentials 380. The PCVS Device Client Credentials 379 include a PCVS Client Profile 383 and a PCVS Client Login 382. The PCVS Server Credentials 380 include a Domain_PCVS 375 and a Passcode_PCVS 376. Both of the PCVS Device Client Credentials 379 and the PCVS Server Credentials 380 are stored in a PCP Device Client Utility 378. The PCVS Server Credentials 380 are later sent through email to a PMG Admin Device 373 for connection to a PMG 308. The PCVS Device Client Credentials 379 are later sent through email to a PCVS Device Client 321 for connection to a PCVS 316.

In Phase two, pairing and registration with the PCVS from the PMG: The PMG Admin Device 373 uses the utility PMG_Device Utility 374 to initialize and provision the PMG 308 from PMG Admin Device 373. As shown in FIG. 3, the PMG 308 contains a PMG_Device Utility 371 and a PMG_VPN Utility 372. The PMG Admin Device 373 is located on the same physical LAN 304 as that of the PMG 308, in order to conduct configuration for security purpose to avoid hacking exposure on Internet or WAN. The Admin Device 373 is itself a PMG Smart Device Client 307. It contains an application utility PMG_Device Utility 374, which in turn contains an entry of the Domain_PCVS 375 and an entry of the Passcode_PCVS 376. The entry of the Domain_PCVS 375 is used to set the server domain address of the corresponding PCVS. The entry of the Passcode_PCVS 376 is used to set the server passcode of the corresponding PCVS. The PMG Admin Device 373 first configures the PCVS Server credentials by setting its domain name through the entries of the Domain_PCVS 375 and the passcode Passcode_PCVS 376. The PCVS Server credentials, the Domain_PCVS 375 and the Passcose_PCVS 376 are used to communicate with the PMG_Device Utility 371 in the PMG 308.

In Phase three, establishing the initial VPN tunnels between the PCVS and the PMG: After the PCVS 316 pairing and registration with the PCVS 316 from the PMG 308, the PMG_VPN Utility 372 connects to a PCVS_VPN Utility 3720 and enables a third VPN channel between the PMG_VPN Utility 372 and the PCVS_VPN Utility 3720. The PCVS_VPN Utility 3720 then calls back to a Private Metaverse (PM) 370, which contains at least one PMG (e.g., the PMG 308), which in turn contains the PMG_VPN Utility 372 to enable a first VPN channel between the PCVS_VPN Utility 3720 and the PMG_VPN Utility 372. The PCVS_VPN Utility 3720 can establish a third VPN tunnel on demand between the PCVS_VPN Utility 3720 and the PMG_VPN Utility 372. The PCVS_VPN Utility 3720 can also establish a third VPN tunnel on demand between the PCVS_VPN Utility 3720 and the PMG_VPN Utility 372, pending the completion in establishing a second VPN tunnel on demand between the PCVS smart device client 309, 310, 311 or 321, and the PCVS 316. Afterwards, the PMG_VPN Utility 372 can establish a first VPN tunnel between the PMG_VPN Utility 372 and the PCVS_VPN Utility 3720. The PCVS_VPN Utility 3720 also enables a second VPN channel between the PCVS_VPN Utility 3720 and any PCVS Device Client 301, 309, 310, 311, or 321, from the cloud in the Internet. The PCVS 316 is then ready for further action on demand from any PCVS Device Client 301, 309, 310, 311, or 321. The PCVS_VPN Utility 3720 communicates with the PCVS_Device Utility 3710, internally inside the PCVS 316. The PCVS_Device Utility 3710 stays in a loop waiting on demand for the future PCVS smart device client request.

In Phase four, connecting to the PMG on demand between the PCVS smart device client and the PMG through the PCVS: The PCVS_VPN Utility 3720 communicates with the PCVS_Device Utility 3710, internally inside the PCVS 316. The PCVS_Device Utility 3720 stays in a loop waiting on demand for the PCVS smart device client request. The PCVS Device Client 321 first registers to the PCVS_Device Utility 3710, with the PCVS Client Credentials, including the PCVS Client Profile and PCVS Client Login. The PCVS_Device Utility 3710 passes the PCVS Client Credentials and the connection request internally inside PCVS 316, to the PCVS_VPN Utility 3720. After registration, the PCVS Device Client 321 connects to the PCVS_VPN Utility 3720 and establishes a second VPN tunnel on demand between PCVS_Device Client 321 and PCVS_VPN Utility 3720. The PCVS_VPN Utility 3720 then establishes a third VPN tunnel on demand between the PCVS_VPN Utility 3720 and the PM 370, which contains at least one PMG (e.g., the PMG 308), which in turn contains the PMG_VPN Utility 372. The second VPN tunnel on demand and the third VPN tunnel on demand are channeled into a single VPN between PCVS_Device Client 321 and PMG_VPN Utility 372, which resides in the PMG 308.

Figure 8:
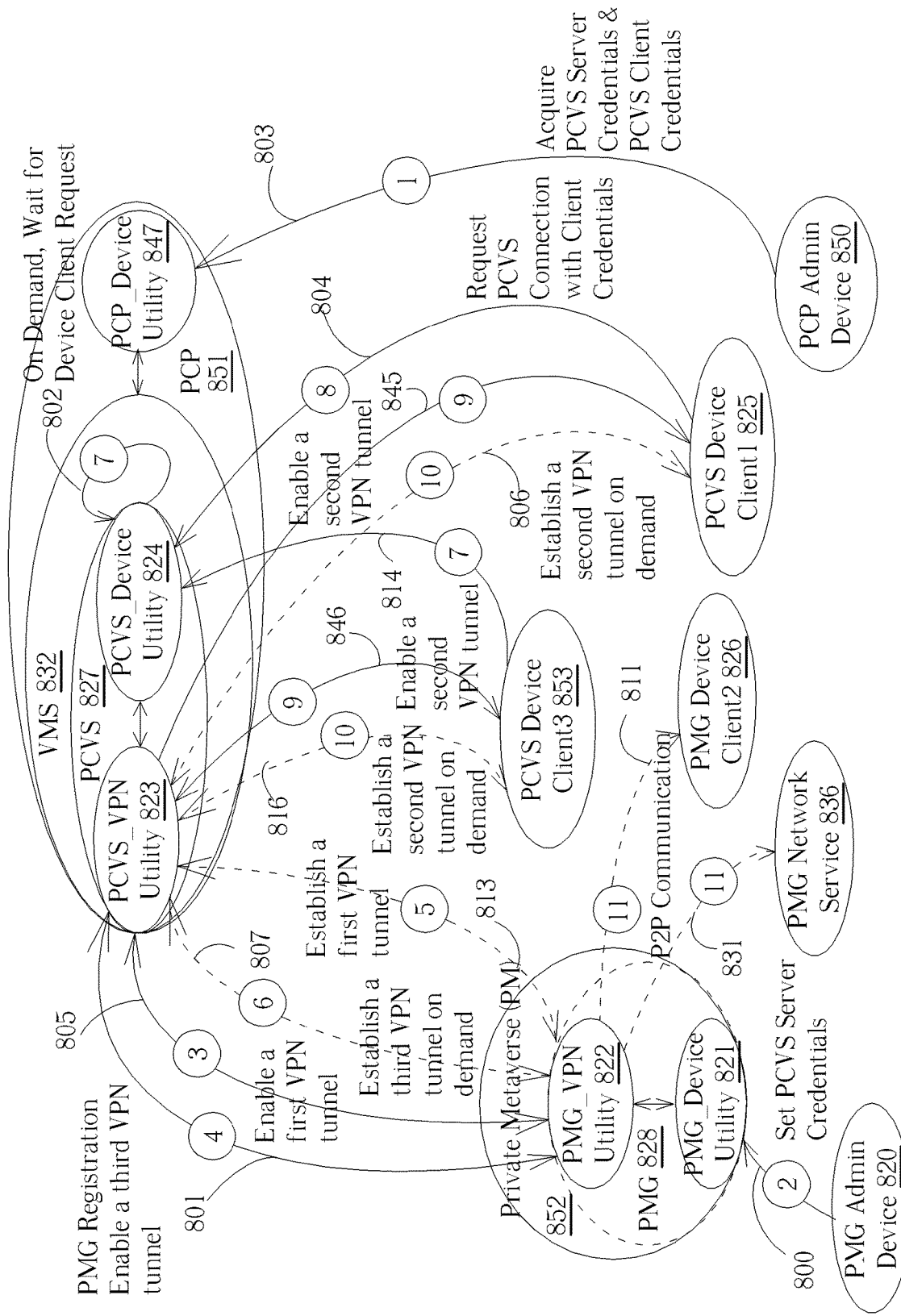
FIG. 8 is a diagram of a communication flow of P2P Connection Mechanism among PMG, PCVS, PCVS smart device client, and a PMG smart device client through a Cloud Network.

In Phase five, running the vertical P2P private and secure PCVS smart device client applications between the at least one PCVS smart device client and the at least one PMG smart device client, the at least one PMG network service, or yet another PCVS smart device client: The PCVS Smart Device Client 301, 311 and 321, through the communication path 322, 324 and 323 respectively are able to locate the PMG 308 with the mechanism disclosed in FIGS. 8-13. The PMG 308 and the Private Cloud VPN Server 316 then build a virtual LAN (VLAN) 340 and a VLAN 3400 allowing the authorized PCVS Smart Device Clients 301, 311 and 321 to join in as members of the VLAN 340 and the VLAN 3400, and in turn connecting to a PMG Device Client 306, or a PNS 328 (e.g., PMG Network Service), or yet another PCVS Device Client (not shown), assuming another PCVS Device Client (not shown) has also successfully connected to the PCVS_VPN Utility 3720. Refer to FIG. 8 for details in VPN tunnels and connection flow. The PCVS Smart Device Client 301 through the installed program can initiate a private and secure communication as a host. The PCVS Smart Device Client 311 or 321 through the installed program can receive the communication invitation as a guest and join the private and secure communication session with the host PCVS Smart Device Client 301, through a vertical P2P private and secure PCVS smart device client application (not shown) offered by Public Cloud Portal 330.

In Phase five, the at least one PMG smart device client and a PCVS smart device client application form a client server relationship. The PCVS smart device client application includes an application Utility on a public cloud network. The functionality of the at least one PMG smart device client is defined by a class code sent to a PCVS smart device client application. The vendor-specific software modules or applications are loaded by the PCVS smart device client application to support the corresponding PMG smart device client from different manufacturers. The device classes include audio, video, human interface device, IP Camera, Smart Lock, Smart Lightbulb, remote control, thermostat, printer, mass storage, Bluetooth, application specific, vendor specific, and others.

As shown in FIG. 3, when the PCVS Smart Device Client 301 wants to start a communication session as a host, the program installed on the host PCVS Smart Device Client first locates and logs-in to the PCP 330 through the communication path 322. After the Private Cloud VPN Server 316 locating the PMG 308, it joins the VLAN 340. The PCVS Smart Device Client commits to join chat communication as a host 301. The program allows the PCVS Smart Device Client 301 to create and host a communication session. The program broadcasts the host session to invite communication guest 321. Afterwards, the program starts scanning for recognizable guest PCVS Smart Device Client 321. Once the guest is authenticated, the PCVS Smart Device Client 301 can start private and secure communication as a host with the authenticated guest PCVS Smart Device Client 321. The private and secure communication includes video, audio, text or application. The application can be a program, utility, operation or transaction that is recognizable by both host and guest.

If the PCVS Smart Device Client 311 or 321 wants to join a communication session as a guest, the program installed on the guest PCVS Smart Device Client first locates and logs-in to the PCP 330 through the communication path 324 or 323 respectively. After the Private Cloud VPN Server 316 locating the PMG 308, it joins the VLAN 340 under the server. The PCVS Smart Device Client 311 or 321 commits to join the communication as a client. The program waits for a communication invitation. Once it receives a communication invitation, the PCVS Smart Device Client 311 or 321 may join a communication session as a guest. The program then starts scanning for recognizable host. Upon identifying the host, the program goes through the communication log-in authentication prompted by the host. Once authenticated, the PCVS Smart Device Client 311 or 321 can join the communication session. The PCVS Smart Device Client 311 or 321 starts private and secure communication as a guest with the host PCVS Smart Device Client 301. The private and secure communication includes video, audio, text or application. The application can be a program, utility, operation or transaction that is recognizable by both host and guest.

In another embodiment of the present invention, the PCVS Smart Device Client can establish a private and secure communication with any service that is reachable on the physical LAN LAN1 350 or the VLAN 340 and the VLAN 3400, under the PMG and the Private Cloud VPN Server. As shown in FIG. 3, once the PCVS Smart Device Client 301, 311 or 321 locates and logs-in to the PCP 330, it may access any PNS 328 that is reachable on the physical LAN LAN1 350, and the physical LAN LAN2 360, the VLAN 340 and the VLAN 3400 under the PMG and the Private Cloud VPN Server through a secure communication path 325. The PNS includes audio, video contents, live or archived information, and execution of applications, social media, messaging, email, storage, backup, calendar, contact, synchronization, sharing, remote desktop, IoT and others.

A number of entities are introduced to allow for the secure communication path 325 including but not limited to: Administrator, Admin Device, PMG Utility, PCVS Utility, PMG smart device client, PCVS smart device client. These entities are defined herein below. Utility is a utility running in the PMG. Admin Device is a device that administrator uses to configure the PMG. PMG smart device client is a device that an Invitee uses to communicate with the PMG. Invitee is a physical party invited by the Admin to access the PMG service and resources. Invitee Device is a PMG Smart Device Client that the Invitee uses to communicate with the PMG.

A number of terms are introduced including Passcode_PCVS, Domain_PCVS_Client, PCVS_Client_Profile, and PCVS_Client_Login. These terms are defined hereinbelow. Passcode_PCVS is a passcode generated by the PCP for the corresponding PCVS 316. Domain_PCVS is the domain address generated by the PCP Passcode_PCVS and Domain_PCVS together form the PCVS Server credentials. PCVS_Client_Profile is the VPN profile file for the PCVS smart device client to connect to the corresponding PCVS 316. PCVS_Client_Login is the VPN login password for the PCVS smart device client to connect to the corresponding PCVS 316. PCVS_Client_Profile and PCVS_Client_Login together form the PCVS Client credentials.

Other terms not associated with the PMG are: PM and Virtual LAN subnet. They are defined herein below. The PM is a private network subsystem which includes a network router, a private LAN, a PMG, at least one PNS, and at least one PMG smart device client. The virtual LAN subnet is the subnet setting of the PMG VPN (virtual private network). It is configurable and changeable to specify the private subnet for security purpose.

The device client 301 is itself a PCVS Smart Device Client. It contains an application utility, the PCP Device Client Utility 378, which in turn contains the PCVS Device Client Credentials 379 and the PCVS Server Credentials 380. The PCVS Device Client Credentials 379 contains the PCVS Client Profile and the PCVS Client Login. The PCVS Server Credentials 380 contains the Domain_PCVS and the Passcode_PCVS.

The typical PCVS Smart Device Client 321 contains a PCVS_Device_Client Utility 381 which in turn contains the PCVS_Client Profile 383 and the PCVS Client Login 382. The PCVS Client Profile 383 is used to connect to the corresponding PCVS 316. The PCVS Client Login 382 is used to login to the corresponding PCVS 316. The PCVS 316 contains the PCVS_Device Utility 3710 and the PCVS_VPN Utility 3720. The PCVS_Device Utility 3710 is used to communicate with the PMG Admin Device 373. The PCVS VPN Utility 3720 is able to communicate with the PMG 308 through the at least one VPN tunnel. The Private Cloud VPN Server 316 acts as a middleman to relay communication between the PCVS smart device clients 321, 301, 311 and the PMG 308. It will call back the PMG 308 on demand based on the PCVS smart device client request.

Figure 4:
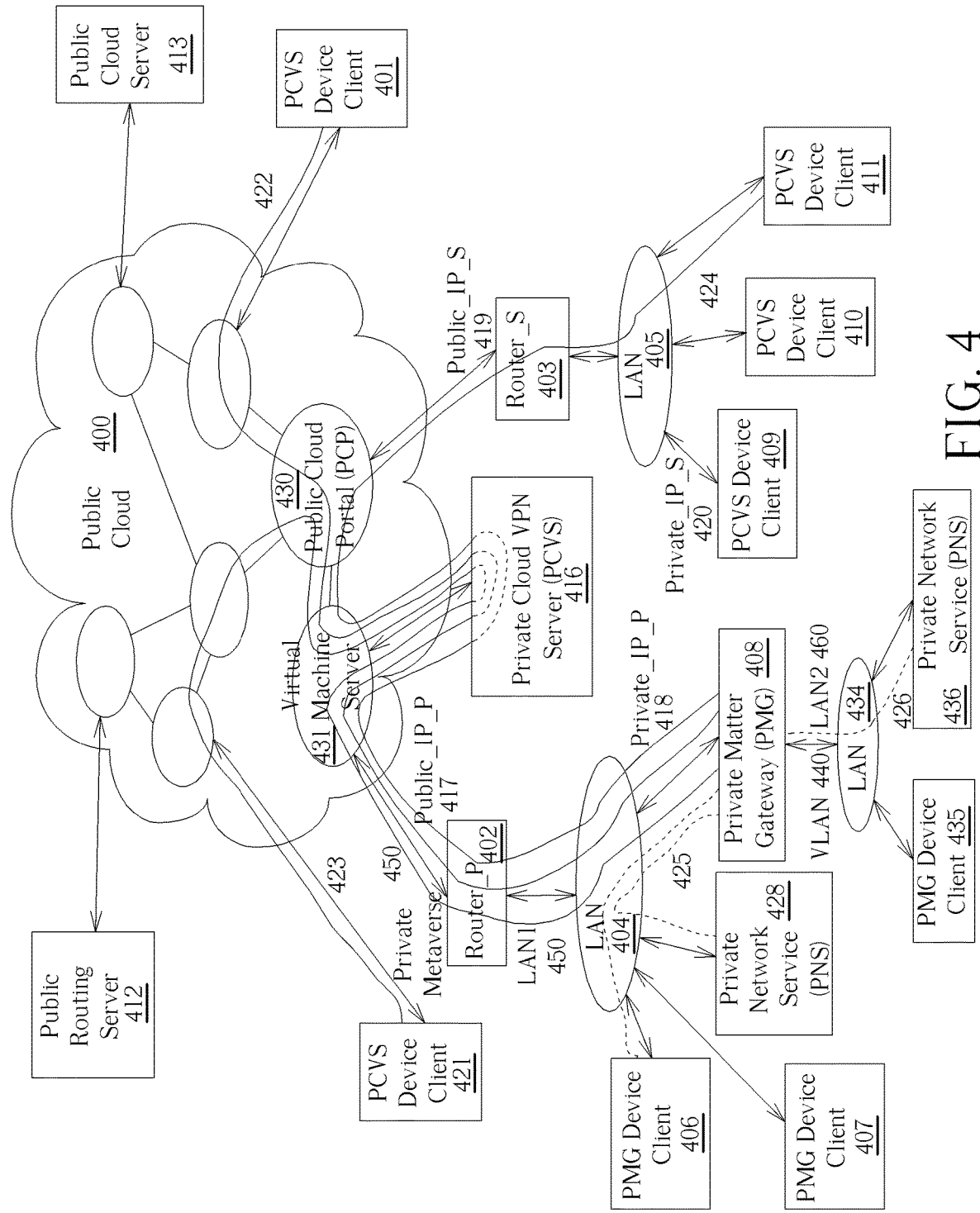
FIG. 4 is a block diagram of a second embodiment of a Cloud Network Infrastructure for the connection mechanism based on channeling multiple VPN tunnels among the PMG, the Private Cloud VPN Server, the PNS, the PMG smart device client, and the PCVS smart device client in accordance with the present invention.

FIG. 4 shows a block diagram of a second embodiment of the invention. A PMG 408 connects to a LAN 404 of a Router_P 402, in a manner similar to the way the PCRS 208 connects to the LAN 204 of the Router_P 202 in FIG. 2. The PMG 408 also has a physical LAN LAN2 460 connecting downstream. A PNS 436 and a PMG Smart Device Client 435 are connected downstream. The PNS 436 is accessible through the communication path 426, connecting through a LAN 434 to the PMG 408. As long as the VLAN 440, the physical LAN LAN1 450, and the physical LAN LAN2 460 are all explorable and accessible by the PCVS Smart Device Clients 411, 410, 409, 401, and 421 across the cloud through the Private Cloud VPN Server 416, and the PMG 408, all PNSs 428 and 436, and PMG Smart Device Clients 406, 407, and 435 become accessible.

Figure 5:
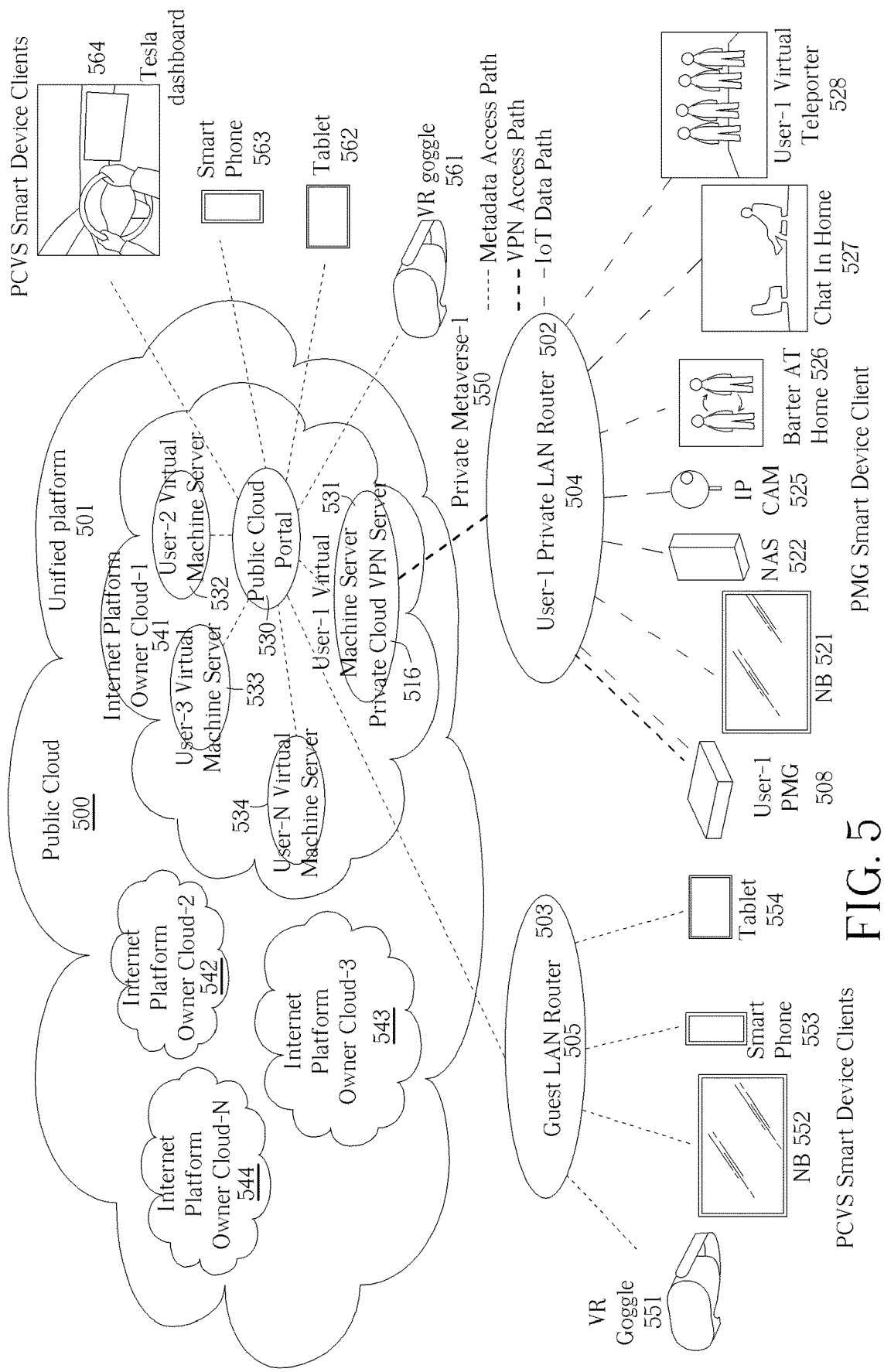
FIG. 5 is a block diagram of a third embodiment of a Cloud Network Infrastructure for the connection mechanism based on channeling multiple VPN tunnels among the PMG, the Private Cloud VPN Server, the PNS, the PMG smart device client, and the PCVS smart device client in accordance with the present invention.

FIG. 5 shows a block diagram of a third embodiment of the invention. The Public Cloud 500 accommodates Internet Platform Owner-1 Cloud 541, Internet Platform Owner-2 Cloud 542, Internet Platform Owner-3 Cloud 543, and Internet Platform Owner-N Cloud 544. The PMG 508 connects to a LAN 504 of a Private LAN Router 502, in a manner similar to the way the PCRS 208 connects to the LAN 204 of the Router_P 202 in FIG. 2. As long as the Private Metaverse-1 550, and the physical LAN 504 are all explorable and accessible by the PCVS Smart Device Clients (e.g., a VR goggle 551, a NB 552, a smart phone 553, a tablet 554, a VR goggle 561, a NB 562, a smartphone 563 and a Tesla dashboard 564), across the cloud through User-1 Virtual Machine Server 531 and the Private Cloud VPN Server 516, and the PMG 508, all PNS (including Barter AT Home 526 and Chat In Home 527), and PMG Smart Device Clients 521, 522, and 525 become accessible. The above effect can be called a Virtual Teleporter. The PCVS Smart Device Client (e.g., a VR goggle 551, a NB 552, a smart phone 553, a tablet 554, a VR goggle 561, a NB 562, a smartphone 563 and a Tesla dashboard 564), virtually teleport itself to the User-1 Private LAN 504, as a User-1 Virtual Teleporter 528, as if it physically resides on the private LAN. The PCVS Smart Device Client is then able to access all PMG Smart Device Clients and network services 521, 522, 525, 526, and 527 privately and security due to the VPN connection nature. Other than the metadata access, no other third party including the Internet Platform Owner-1 Cloud 541 is able to track or monitor the VPN access as well as the IoT data content. Through the Virtual Teleporter effect, a plurality of usage models are available: (A) Access to home from anywhere (ATHFA), which involves with all PMG Smart Device Clients and network services 521, 522, 525, 526, and 527. (B) Work from home from anywhere (WFHFA), which involves with PMG Smart Device Clients relevant to office equipment such as NB 521 and NAS 522. (C) Chat in home from anywhere (CIHFA), which involves with a PNS, Chat In Home network service 527. (D) Barter at home from anywhere (BAHFA), which involves a PNS, Barter At Home network service 526. The Teleporter effect of access to the PMG Smart Device Client 525 is the example of ATHFA; while the access to the PMG Smart Device Clients 521 and 522 are the examples of WFHFA; while the access to the PMG network service 527 is the example of CIHFA; while the access to the PMG network service 526 is the example of BAHFA. The Teleporter effect of the Virtual Teleporter 528 will unify the Internet Platform Owner-1 Cloud 541, the Internet Platform Owner-2 Cloud 542, the Internet Platform Owner-3 Cloud 543, and the Internet Platform Owner-N Cloud 544 into a single unified platform 501, allowing platform agnostic access with the above mentioned usage models.

Figure 6:
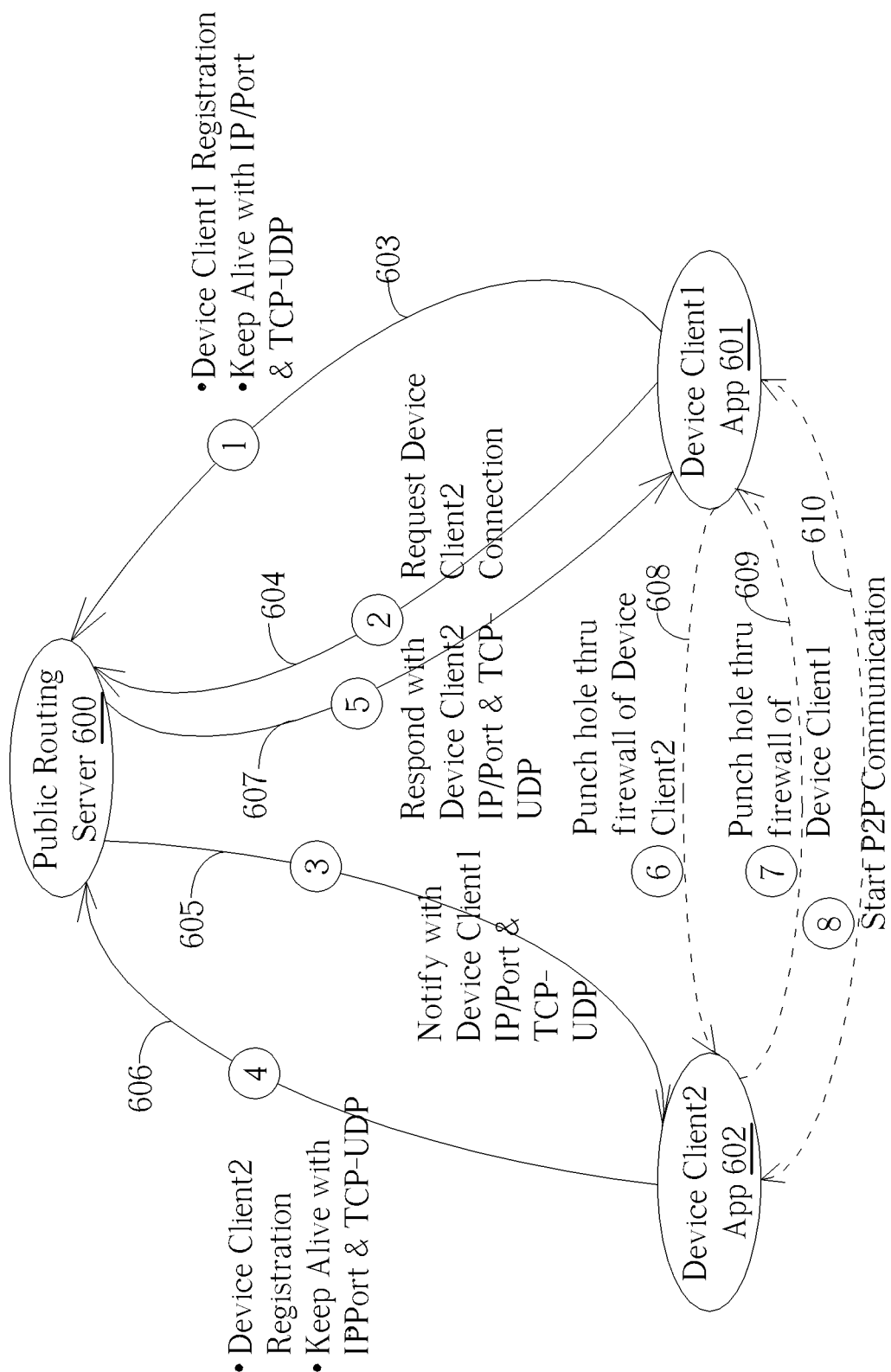
FIG. 6 shows the communication flow of P2P Connection Mechanism between a Device Client1 and a Device Client2 through a Cloud Network.

FIG. 6 shows the communication flow of P2P Connection Mechanism between a Device Client1 and a Device Client2 through a Cloud Network. A Device Client1 App 601 and a Device Client2 App 602 on the Cloud Network can communicate with each other through a Public Routing Server 600 (e.g., a Public VPN Routing Server Utility), the Public Routing Server 112 or the Public VPN Routing Server 114 in FIG. 1. The Device Client1 App 601 first register to the Public Routing Server 600 with its IP address and port capability in Transmission Control Protocol (TCP)/User Datagram Protocol (UDP) protocols. The Device Client1 App 601, IP address and ports are kept alive with the routing server 603. The Device Client1 App 601 then requests to the Public Routing Server 600 for connection to the Device Client2 App 602, 604. The Public Routing Server 600 then notifies the Device Client2 App 602 with the IP address and port capability in TCP/UDP protocols of the Device Client1 App 601 and its intention to connect 605. The Device Client2 App 602 then replies to the Public Routing Server 600 with its own registration that includes its IP address and port capability in TCP/UDP protocols. The IP address and port capability of the Device Client2 App 602 are kept alive with connection to the Public Routing Server 600. The Public Routing Server 600 then responds to the Device Client1 App 601 with the IP address and port capability in TCP/UDP protocols of the Device Client2 App 602, 607. After receiving the IP address and port capability in TCP/UDP protocols of the Device Client2 App 602, the Device Client1 App 601 starts punching holes through the firewall of the Device Client2 App 602, 608. The Device Client2 App 602 also starts punching holes through the firewall of the Device Client1 App 601, 609. Eventually, both sides of the firewall holes are punched through. The P2P communication starts between the Device Client1 App 601 and the Device Client2 App 602, 610. Note that without the Public VPN Routing Server, the connection mechanism between the Public Routing Server 600 and either Device Client1 App 601 or Device Client2 App 602 is not possible. It is the fundamental flaw of the connection mechanism that has to rely on a Public VPN Routing Server.

Figure 7:
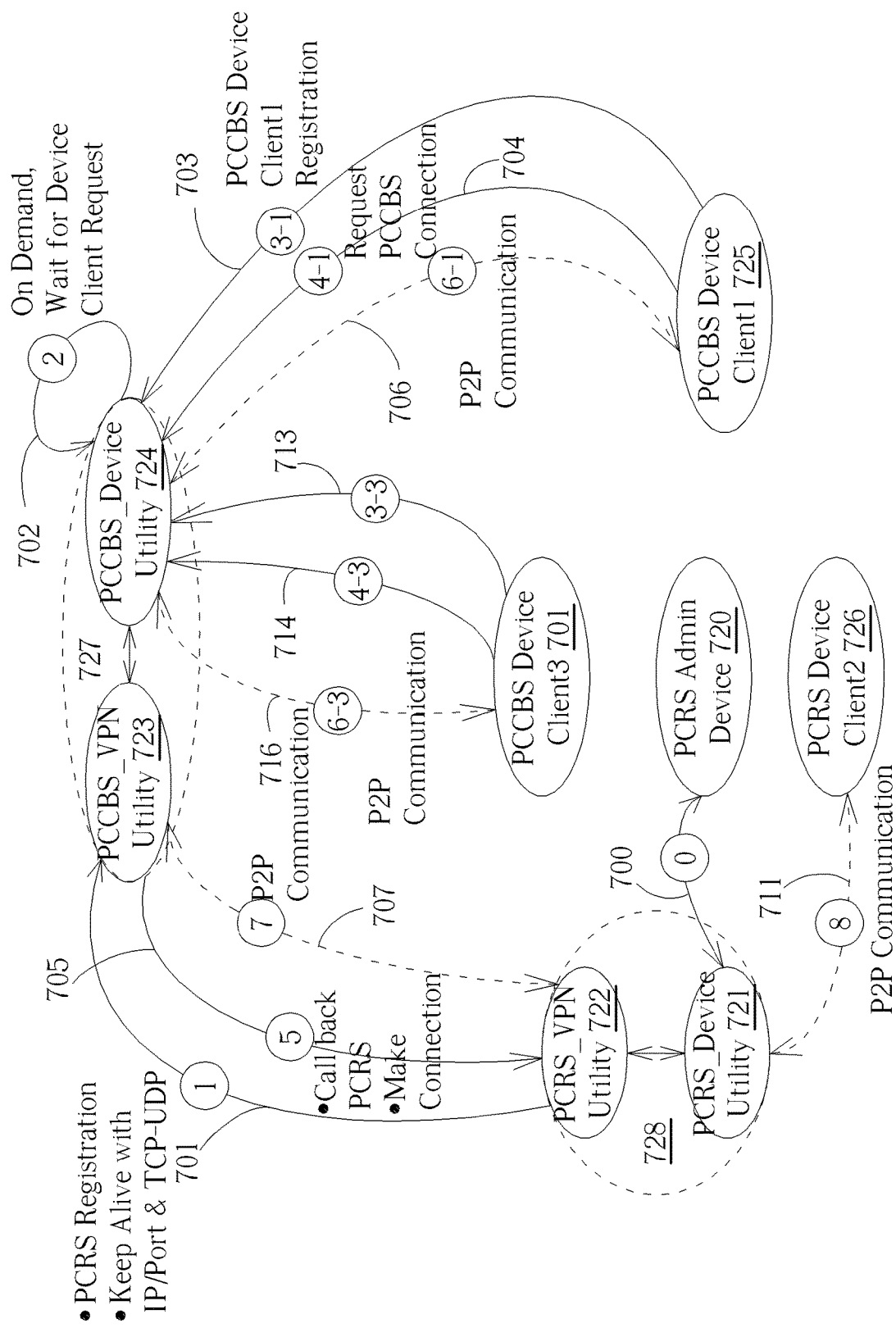
FIG. 7 is a diagram of a communication flow of P2P Connection Mechanism among PCRS, PCCBS, PCCBS smart device client, and a PCRS smart device client through a Cloud Network.

FIG. 7 is a diagram of a communication flow of P2P Connection Mechanism between a Private Cloud Relay Server (PCRS) and a PCCBS smart device client through a Cloud Network. It shows in accordance to the present invention that no Public VPN Routing Server is required for the PCCBS Smart Device Clients to connect and access to either the PCRS 728, or another PCCBS Smart Device Client, or another PCRS Smart Device Client, or the network services under the server through the Cloud Network. As shown in FIG. 7, a PCCBS Device Client1 725 and a PCRS 728 on the Cloud Network can communicate with each other without going through the Public Routing Server 112 or the Public VPN Routing Server 114 in FIG. 1. The PCCBS Device Client1 725 first requests to connect to a PCCBS Device Utility (Server part) 724, with its IP address and port capability in TCP/UDP protocols. The PCCBS Device Client1 725's IP address and ports are kept alive with the PCCBS_Device Utility 724. The PCCBS_Device Utility (Server part) 724 receives the registration through a Call-Back Server Message Box (not shown). The PCCBS Device Client1 725 then requests to the PCCBS Device Utility (Server part) 724 also through the Client Message Box message_box_S 215 in FIG. 2 for connection to a PCCBS_VPN Utility (Client part) 723. The PCCBS_Device Utility (Server part) 724 receives the request through the Call-Back Server Message Box (not shown) and notifies the PCCBS_VPN Utility (Client part) 723 with the IP address and port capability in TCP/UDP protocols of the PCCBS Device Client1 725 and its intention to connect 703. The PCCBS_VPN Utility (Client part) 723 then replies to the PCCBS_Device Utility (Server part) 724 with its own registration that includes its IP address and port capability in TCP/UDP protocols. The IP address and port capability of a PCRS Device Client2 726 are kept alive with connection to the PCCBS_Device Utility (Server part) 724. The PCCBS Device Utility (Server part) 724 then responds to the PCCBS Client Devic1 725 with the IP address and port capability in TCP/UDP protocols of the PCRS_VPN Utility 722 through the Call-Back Server Message Box (not shown) via a communication route 705. The PCRS_VPN Utility 722 then activates a P2P communication to connect to PCCBS_VPN Utility 723. Afterwards, the PCCBS_Device Utility 724 starts listening in a loop 702, to wait for a device client request from the PCCBS Device Client1 725. As soon as the PCCBS Device Client1 725 initiates a communication request to the PCCBS_Device Utility 724, it establishes a P2P communication channel 706 with the PCCBS_Device Utility 724. It in turns triggers another P2P communication between the PCCBS_VPN Utility 723 and the PCRS_VPN Utility 722. From this point on, the PCCBS Device Client1 725 connects to the PCRS_VPN Utility 722 and is in turn able to access any PCRS Device Client 720 or network service (not shown). The P2P communication starts between the PCCBS Device Client1 725 and the PCRS_VPN Utility 722. The PCCBS Device Client1 725 can then securely connect to a virtual private LAN on a PCRS private LAN.

The PCCBS Device Client1 725 is able to access any PCRS Smart Device Client (e.g., the PCRS Device Client2 726) or PNS (not shown) accessible under the PCRS private LAN. Other PCCBS smart device clients 201, 221, 209, 210, 211 in FIG. 2 can connect to the PMG through the same connection mechanism as shown in FIG. 7. Once any pair of PCRS smart device clients and PCVS smart device clients connect to the VLAN 240 and the VLAN 2400 of the PCRS 728 and the PCCBS 727, they can conduct the private and secure communication between themselves for text, audio or video communication.

FIG. 8 is a diagram of a communication flow of P2P Connection Mechanism between PMG, PCVS, a PMG smart device client and a PCVS smart device client through a Cloud Network. It shows in accordance to the present invention that no Public Cloud Routing Server is required for the PCVS smart device clients to connect and access to either the Server PMG 828, PCVS 827, or another PMG smart device client, or the network services under the server through the Cloud Network. As shown in FIG. 8, a PCVS Device Client1 825 and a PMG 828 on the Cloud Network can communicate with each other without going through the Public Routing Server 112 or the Public VPN Routing Server 114 in FIG. 1. Unlike the prior art in FIG. 7, initially, one of the PCVS_Device Clients, a PCP Admin Device 850, connects to a PCP 851, which is a cloud-based public cloud portal, which contains a PCP Device Utility 847, as in circle 1, 803. The PCP Admin Device 850 acquires PCVS Server Credentials as well as PCVS Client Credentials from the PCP_Device Utility 847. The PCVS Server Credentials include Domain_PCVS, the PCVS server domain, and Passcode_PCVS, the PCVS server passcode. The PCVS Client Credentials include PCVS Client Profile, the client login profile file, and the PCVS Client Login, the login password of the client profile. The PCVS Server Credentials are sent to the PMG Admin Device 820 via email or other means. The PCVS Client Credentials are sent to authorized PCVS Device Clients, such as the PCVS Device Client1 825, for future P2P connection with one of the PMG Device Clients, such as a PMG Device Client2 826 on the private LAN of the PMG 828. The PCP 851 contains at least one PCP_Device Utility (e.g., the PCP_Device Utility 847), which in turn contains at least one Virtual Machine Server (VMS) (e.g., a VMS 832), which in turn contains at least one PCVS (e.g., a PCVS 827), which in turn contains a PCVS_Device Utility 824 and a PCVS_VPN Utility 823. The VMS 832 along with the PCVS 827 forms a one-to-one corresponding relationship with the PMG 828, deployed in the private LAN. The PCP_Device Utility 847 is a public cloud portal which is scalable and may correspond to the at least one VMS (e.g., the VMS 832) and the at least one PCVS (e.g., the PCVS 827).

The PMG Admin Device 820, after receiving the PCVS Server Credentials, first initializes and provisions the PMG 828 with the server credentials through the PMG_Device Utility 821, as described in circle 2, 800. The PMG_Device Utility 821 then passes the info internally inside the PMG 828, to a PMG_VPN Utility 822. It then registers to the PCVS_VPN Utility 823 with the PCVS Server credentials info that includes the Domain_PCVS and Passcode_PCVS through the TCP/UDP protocols, as in circle 4, 801. The PCVS_VPN Utility 823 then calls back to a PM 852, which contains at least one PMG (e.g., the PMG 828), which in turn contains the PMG_VPN Utility 822 to enable a first VPN channel between the PCVS_VPN Utility 823 and the PMG_VPN Utility 822, as in circle 3, 805. Afterwards, the PMG_VPN Utility 822 establishes a first VPN tunnel between the PMG_VPN Utility 822 and the PCVS_VPN Utility 823, as in circle 5, 813. After registration, the PMG_VPN Utility 822 connects to the PCVS_VPN Utility 823 and enables a third VPN tunnel on demand between the PMG_VPN Utility 822 and the PCVS_VPN Utility 823. The PCVS_VPN Utility 823 can establish a third VPN tunnel on demand between the PCVS_VPN Utility 823 and the PMG_VPN Utility 822, as in circle 6, 807. The PCVS_VPN Utility 823 can also establish a third VPN tunnel on demand between the PCVS_VPN Utility 823 and the PMG_VPN Utility 822, pending the completion in establishing a second VPN tunnel on demand, as in circle 10, 806. The PCVS_VPN Utility 823 also enables a second VPN channel between the PCVS_VPN Utility 823 and any PCVS Device Client (e.g., the PCVS Device Client1 825 or a PCVS Device Client3 853), as in circle 9, 845 or 846, from the cloud in the Internet. The PCVS 827 is then ready for further action on demand from any PCVS Device Client (e.g., the PCVS Device Client1 825) from the cloud in the Internet. The PCVS_VPN Utility 823 communicates with a PCVS_Device Utility 824, internally inside the PCVS 827. The PCVS_Device Utility 824 stays in a loop waiting on demand for the PCVS smart device client request, as circle 7, 802. The PCVS Device Client1 825 first registers to the PCVS_Device Utility 824, with the PCVS Client Credentials, including the PCVS Client Profile and the PCVS Client Login, as in circle 8, 804 or 814. The PCVS_Device Utility 824 passes the PCVS Client Credentials and the connection request internally inside the PCVS 827, to the PCVS_VPN Utility 823. After registration, the PCVS Device Client1 825 connects to the PCVS_VPN Utility 823 and establishes a second VPN tunnel on demand between the PCVS_Device Client1 825 and the PCVS_VPN Utility 823, as in circle 10, 806 or 816. The PCVS_VPN Utility 823 then establishes a third VPN tunnel on demand between the PCVS_VPN Utility 823 and the PM 852, which contains at least one PMG (e.g., the PMG 828), which in turn contains the PMG_VPN Utility 822, as in circle 6, 807. The second VPN tunnel on demand as in circle 10, 806 and the third VPN tunnel on demand as in circle 6, 807 are channeled into a single VPN between the PCVS_Device Client1 825 and the PMG_VPN Utility 822 and in turn connecting to the PMG_Device Client2 826, as in circle 11, 811, or a PMG Network Service 836 as in circle 11, 831, or yet another PCVS Device Client (e.g., the PCVS Device Client3 853) as in circle 10, 816, assuming another PCVS Device Client (e.g., the PCVS Device Client3 853) has also successfully connected to the PCVS_VPN Utility 823. The PCVS Device Client1 825 and the PCVS Device Client3 853 therefore form a P2P private and secure communication channel between them, which is the foundation for further secure chat applications in text, audio, and video, including crypto currency transaction.

Compared with the prior art in FIGS. 6 and 7, the present invention is more scalable and expandable, as it introduces a few new entities, including the PCP 851, the PCP_Device Utility 847, the VMS 832, the PM 852, the PCP Admin Devices 850, the PMG Admin Device 820, the PCVS Server Credentials, and the PCVS Client Credentials. It connects first to a Public Cloud Portal, then to at least one PCP_Device Utility 824, then to at least one VMS (e.g., the VMS 832), then to the at least one PCVS (e.g., the PCVS 827), then to at least one PM (e.g., the PM 852), then to at least one PMG (e.g., the PMG 828), then to at least one PMG Device Client (e.g., the PMG Device Client2 826), or to at least one PMG Network Service (e.g., the PMG Network Service 836), or to yet another PCVS Device Client 853. The PCP Admin Device 850 starts with acquiring the PCVS Server Credentials and Client Credentials from the PCP 851. Afterwards, the PCVS Server Credentials are sent to the PMG Admin Device 820 to set to the PMG 828 for connection with the corresponding PCVS 827, which is inside the VMS 832, which is inside the PCP 851. Further, there are at least three VPN tunnels binding together before the final two VPN tunnels forming a single VPN tunnel for the P2P communication between the PCVS Device Client1 825 and the PMG PCVS Device Client1 826, the PMG network service 836, or yet another PCVS smart device client (e.g., the PCVS Device Client3 853) in a vertical P2P private and secure PCVS smart device client application.

Figure 9:
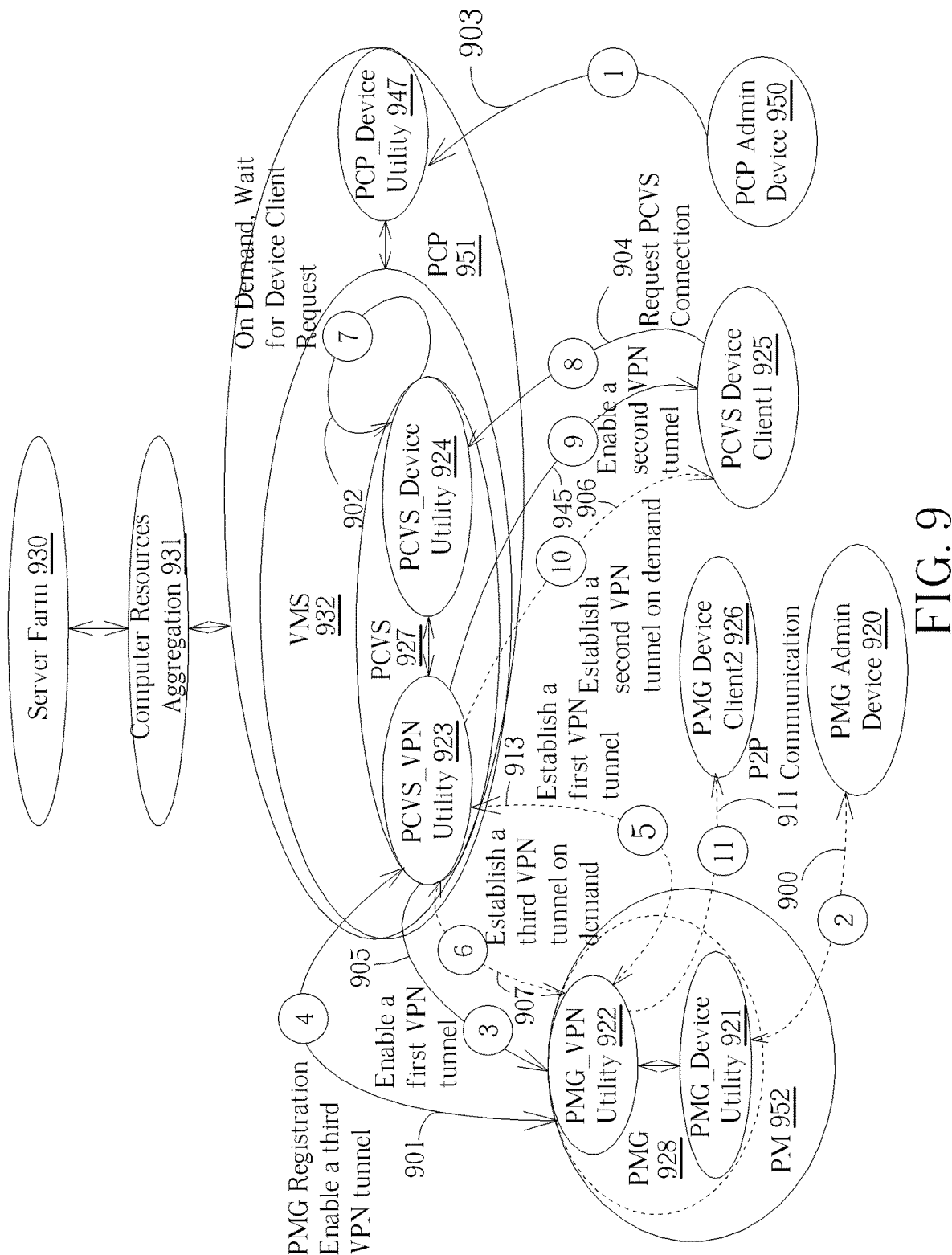
FIG. 9 is a diagram of a communication flow of P2P Connection Mechanism among PMG, PCVS, PCVS smart device client, and a PMG smart device client through a Cloud Network based on server farm, computer resources aggregation and VMS.

FIG. 9 is a diagram of a communication flow of P2P Connection Mechanism between PMG, PCVS, a PMG smart device client and a PCVS smart device client through a Cloud Network based on server farm, computer resources aggregation and virtual machine server. Further, FIG. 9 expands upon FIG. 8 by adding a server farm 930 and a computer resources aggregation 931 to exemplify the implementation of the PMG connection mechanism in a hyperscale data center. The hyperscale data center may have at least one server farm (e.g., the server farm 930), at least one computer resources aggregation (e.g., the computer resources aggregation 931), at least one PCP (e.g., a CPC 951), and at least one VMS (e.g., a VMS 932). The VMS 932 is scalable in quantity and size. The hyperscale datacenter or the service provider may construct and deploy the at least one PCP (e.g., the CPC 951) and a large number of independent PCVS (e.g., a PCVS 927) in its corresponding VMSs (e.g., the VMS 932) in order to service its corresponding PMG (e.g., a PMG 928) and the corresponding PMG smart device clients (e.g., a PMG Device Client2 926). In essence, a community pair of P2P communication relationship between a PCVS Device Client1 925 (a PCVS smart device client) and the PMG Device Client2 926 may be constructed and deployed by the platform owner who is responsible for maintaining the VMS 932 with or without the topology of the computer resources aggregation 931 and the server farm 930. A possible business model, for example, is for an Internet platform owner to offer to a large number of subscribers to host their private and secure PCVS 927 in the VMS 932. In addition, a separate private and secure PMG 928 is also offered to allow the individual subscriber to install the PMG 928 in their private LAN. Through the invention, the platform subscriber may establish from anywhere, a P2P communication between its PCVS smart device client (e.g., the PCVS Device Client1 925), such as a smart phone, a tablet or a Tesla dashboard, and a PMG smart device client (e.g., the PMG Device Client2 926), such as a notebook (NB), IoT device, network attached storage (NAS), set-top-box (STB), smart appliance, or media server, residing on the subscriber's private and secure LAN. FIG. 9 shows in accordance with the present invention that no public cloud Routing Server is required for the PCVS smart device clients (e.g., the PCVS Device Client1 925) to connect and access to either the Server PMG 928, PCVS 927, or another PMG smart device client (e.g., the PMG Device Client2 926), or the network services (not shown) under the server through the Cloud Network. As shown in FIG. 9, the PCVS Device Client1 925 and the PMG 928 on the Cloud Network may communicate with each other without going through the Public Routing Server 112 or the Public VPN Routing Server 114 in FIG. 1. Initially, one of the PCVS_Device Clients, a PCP Admin Device 950, connects to the PCP 951, which is a cloud-based public cloud portal, which contains a PCP Device Utility 947, as in circle 1, 903. The PCP Admin Device 950 acquires PCVS Server Credentials as well as PCVS Client Credentials from the PCP_Device Utility 947. The PCVS Server Credentials include Domain_PCVS, the PCVS server domain, and Passcode_PCVS, the PCVS server passcode. The PCVS Client Credentials include PCVS Client Profile, the client login profile file, and PCVS Client Login, the login password of the client profile. The PCVS Server Credentials are sent to a PMG Admin Device 920 via email or other means. The PCVS Client Credentials are sent to authorized PCVS Device Clients, such as the PCVS Device Client1 925, for future P2P connection with one of the PMG Device Clients, such as the PMG Device Client2 926 on the private LAN of the PMG 928. The PCP 951 contains at least one PCP_Device Utility (e.g., the PCP_Device Utility 947), which in turn contains the at least one VMS (e.g., the VMS 932), which in turn contains at least one PCVS (e.g., the PCVS 927), which in turn contains a PCVS_Device Utility 924 and a PCVS_VPN Utility 923. The VMS 932 along with the PCVS 927 forms a one-to-one corresponding relationship with the PMG 928, deployed in the private LAN. The PCP_Device Utility 947 is a public cloud portal which is scalable and may correspond to the at least one VMS (e.g., the VMS 932) and the at least one PCVS (e.g., the PCVS 927).

The PMG Admin Device 920, after receiving the PCVS Server Credentials, first initializes and provisions the PMG 928 with the server credentials through a PMG_Device Utility 921, as described in circle 2, 900. The PMG_Device Utility 921 then passes the info internally inside the PMG 928, to a PMG_VPN Utility 922. It then registers to the PCVS_VPN Utility 923 with the PCVS Server credentials info that includes the Domain_PCVS and Passcode_PCVS through the TCP/UDP protocols, as in circle 4, 901. After registration, the PMG_VPN Utility 922 connects to the PCVS_VPN Utility 923 and enables a third VPN channel between the PMG_VPN Utility 922 and the PCVS_VPN Utility 923. The PCVS_VPN Utility 923 then calls back to a PM 952, which contains at least one PMG (e.g., the PMG 928), which in turn contains the PMG_VPN Utility 922 to enable a first VPN channel between the PCVS_VPN Utility 923 and the PMG_VPN Utility 922, as in circle 3, 905. The PCVS_VPN Utility 923 can establish a third VPN tunnel on demand between the PCVS_VPN Utility 923 and the PMG_VPN Utility 922, as in circle 6, 907. The PCVS_VPN Utility 923 can also establish a third VPN tunnel on demand between the PCVS_VPN Utility 923 and the PMG_VPN Utility 922, pending the completion in establishing a second VPN tunnel on demand, as in circle 10, 906. Afterwards, the PMG_VPN Utility 922 establishes a first VPN tunnel between the PMG_VPN Utility 922 and the PCVS_VPN Utility 923, as in circle 5, 913. The PCVS_VPN Utility 923 also enables a second VPN channel between the PCVS_VPN Utility 923 and any PCVS Device Client (e.g., the PCVS Device Client1 925), as in circle 9, 945, from the cloud in the Internet. The PCVS 927 is then ready for further action on demand from any PCVS Device Client (e.g., the PCVS Device Client1 925) from the cloud in the Internet. The PCVS_VPN Utility 923 communicates with the PCVS_Device Utility 924, internally inside the PCVS 927. The PCVS_Device Utility 924 stays in a loop waiting on demand for the PCVS smart device client request, as circle 7, 902. The PCVS_Device Client1 925 first registers to the PCVS_Device Utility 924, with the PCVS Client Credentials, including the PCVS Client Profile and PCVS Client Login, as in circle 8, 904 or 914. The PCVS_Device Utility 924 passes the PCVS Client Credentials and the connection request internally inside the PCVS 927, to the PCVS_VPN Utility 923. After registration, the PCVS Device Client1 925 connects to the PCVS_VPN Utility 923 and establishes a second VPN tunnel on demand between the PCVS Device Client1 924 and the PCVS_VPN Utility 923, as in circle 10, 906 or 916. The PCVS_VPN Utility 923 then establishes a third VPN tunnel on demand between the PCVS_VPN Utility 923 and the PM 952, which contains at least one PMG (e.g., the PMG 928), which in turn contains the PMG_VPN Utility 922, as in circle 6, 907. The second VPN tunnel on demand as in circle 10, 906 and the third VPN tunnel on demand as in circle 6, 907 are channeled into a single VPN between the PCVS_Device Client1 925 and the PMG_VPN Utility 922 and in turn connecting to the PMG Device Client2 926, as in circle 11, 911, or a PMG Network Service (not shown) as in circle 11, 911.

Figure 10:
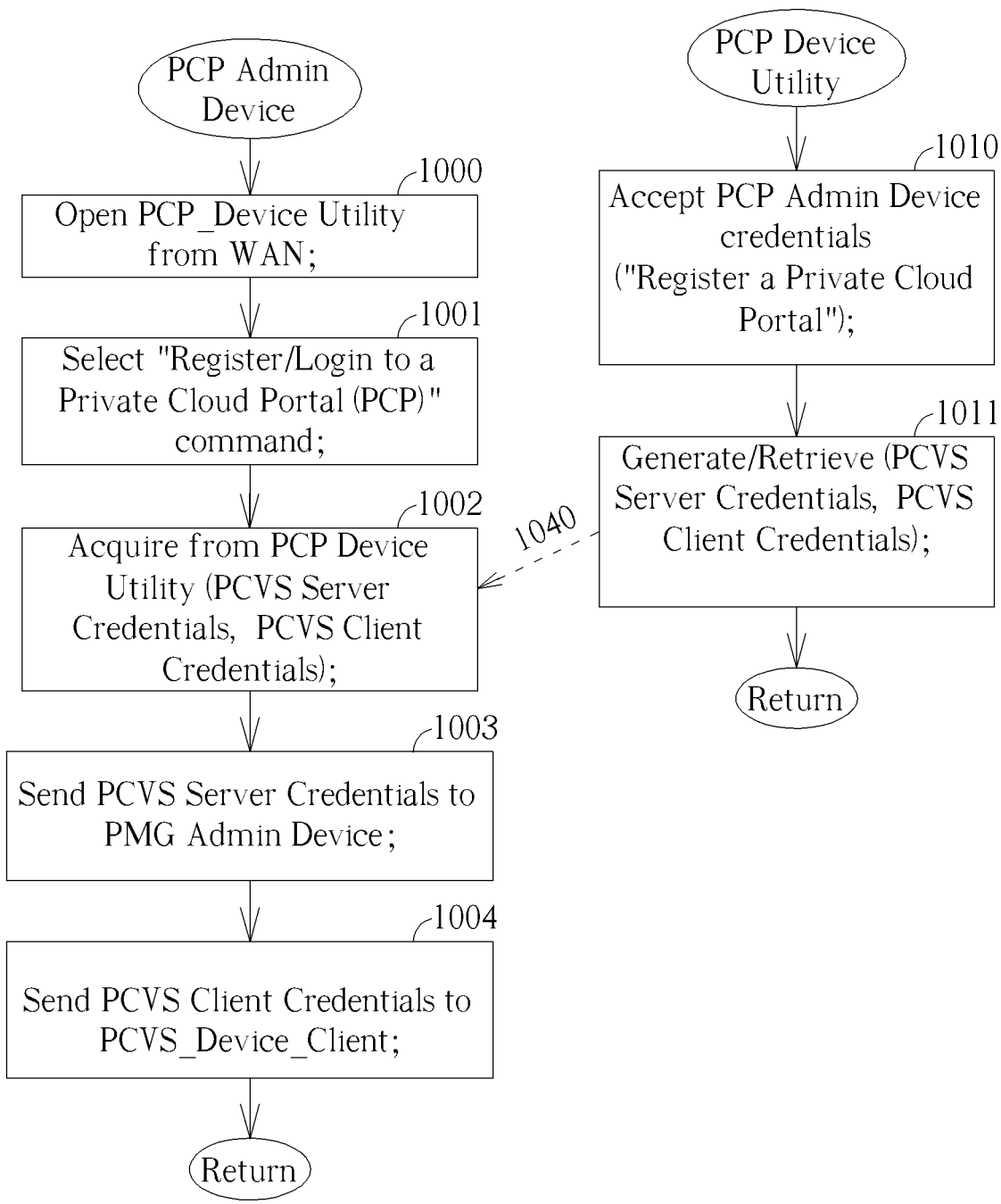
FIG. 10 shows the communication flow of Registering to a Public Cloud Portal by a PCP Admin Device in accordance with the present invention.

FIG. 10 shows the communication flow of Registering to a Public Cloud Portal by a PCP Admin Device in accordance with the present invention. The PCP Admin Device first opens the PCP Device Utility from the WAN, via step 1000. Next, "Register a Public Cloud Portal" command on the PCP Device Utility is selected, via step 1001. Next, the PCVS Server Credentials as well as the PCVS Client Credentials are acquired, via step 1002. The PCVS Server Credentials contains the PCVS server domain, Domain_PCVS, and the server passcode, Password_PCVS. The PCVS Client Credentials contains the PCVS Client Profile and the PCVS Client Login. Next, the PCVS Server Credentials including the Domain_PCVS and the Password PCVS are sent to the PMG Admin Device, via step 1003. The PCVS Client Credentials including PCVS Client Profile and the PCVS Client Login are sent to the PCVS_Device Client, via step 1004, for future P2P communication with the targeted PMG Device Clients, PMG Network Service, or another PCVS Device Client.

In the meantime, the PCP_Device Utility starts accepting command from PCP Admin Device to register to the PCP, via step 1010. The PCVS Server Credentials and the PCVS_Client Credentials are either generated or retrieved by the PCP_Device Utility, via step 1011. Both credentials are then sent back to the PCP Admin Device, via step 1040.

Figure 11:
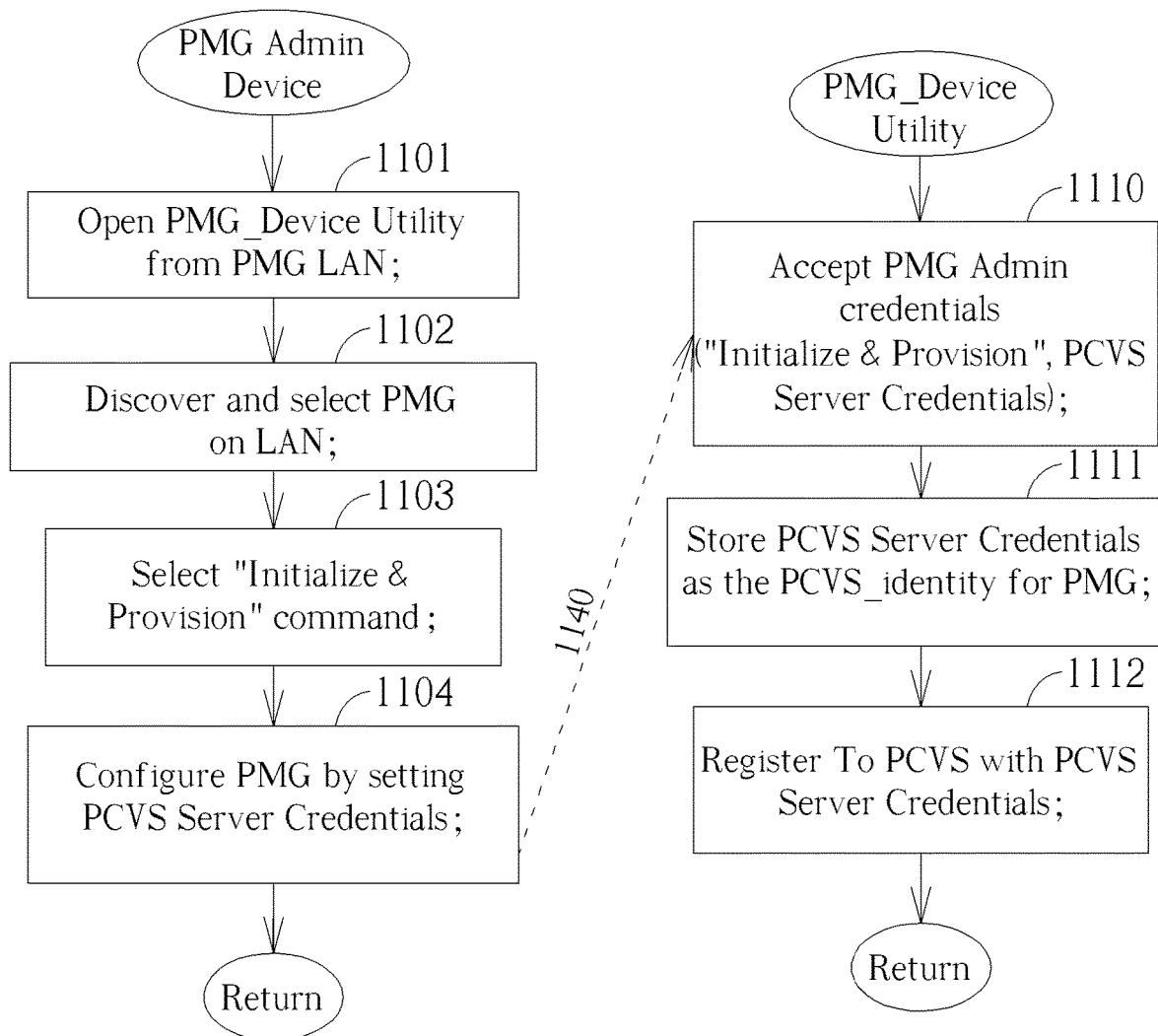
FIG. 11 shows the communication flow of Initializing and Provisioning of the PMG by PMG Admin Device in accordance with the present invention.

FIG. 11 shows the communication flow of the Initializing and Provisioning of the PMG by the PMG Admin Device in accordance with the present invention. As shown in FIG. 11, the PMG Admin Device first opens PMG_Device Utility from PMG LAN, via step 1101. Thereafter, discover and select PMG on LAN, via step 1102. Then the "Initialize and Provision" command on PMG_Device Utility is selected, via step 1103. Thereafter, the PMG is configured by setting PCVS Server Credentials, including the PCVS server domain, Domain_PCVS, and the PCVS server passcode, Passcode_PCVS, as the unique PMG identity, via step 1104. The PCVS Server Credentials are then sent to PMG_Device Utility, via step 1140.

The PCVS Server Credentials (Domain_PCVS, Passcode_PCVS) are the accepted, via step 1110, and stored as the identity for PMG, via step 1111. Then the PMG is registered to a PCVS as a corresponding client, via step 1112.

Figure 12:
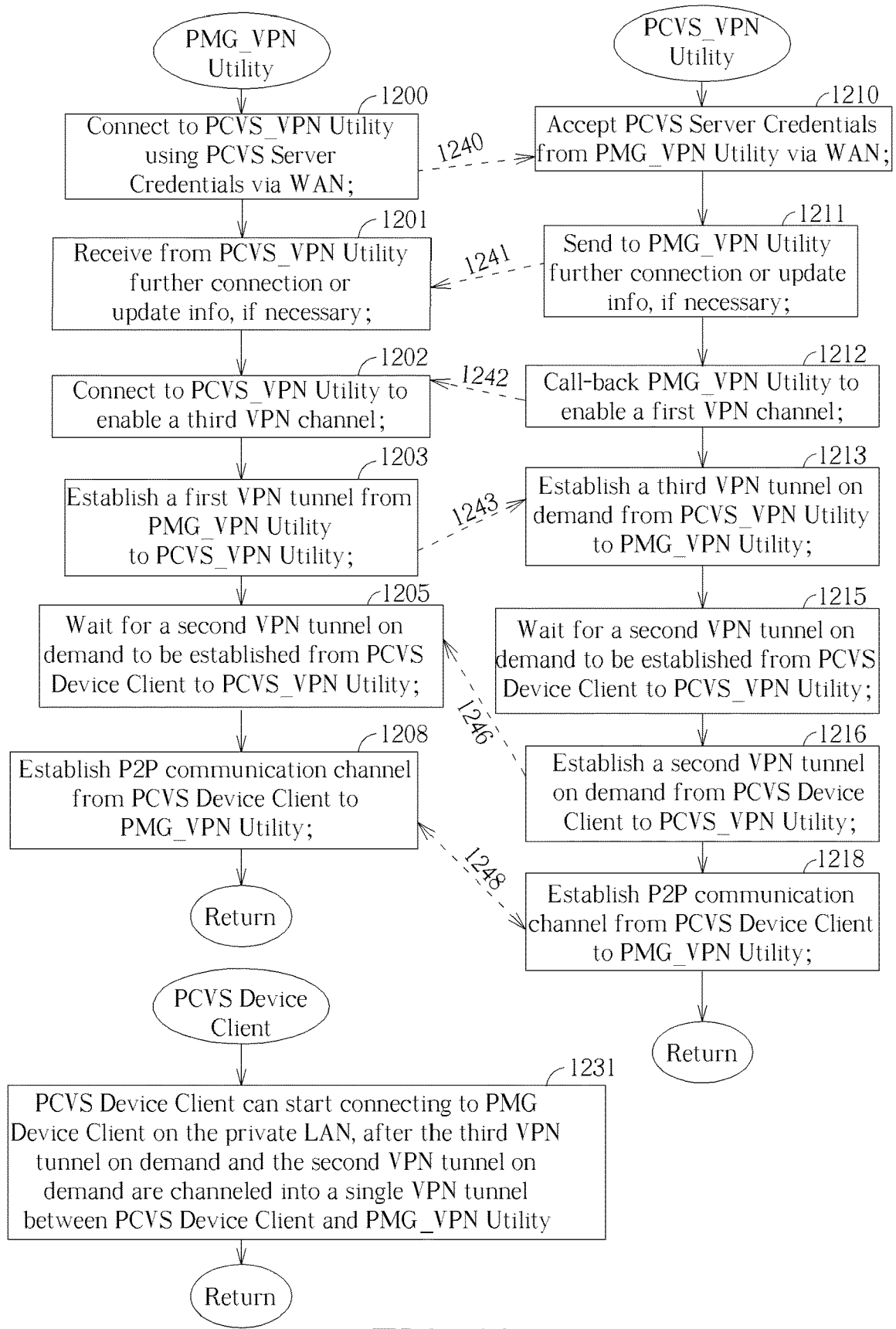
FIG. 12 shows the communication flow of Connection from the PCVS_VPN Utility to the PMG_VPN Utility and the connection between a PCVS Device Client and a PMG Device Client on a private LAN in accordance with the present invention.

FIG. 12 shows the communication flow of Connection from the PCVS_VPN Utility to the PMG_VPN Utility and the connection between a PCVS Device Client and a PMG Device Client on a private LAN in accordance with the present invention. The PMG_VPN Utility first connects to PCVS_VPN Utility using PCVS Server Credentials via WAN, via step 1200. The PCVS_VPN Utility accepts PCVS Server Credentials from PMG_VPN Utility via WAN, via step 1210. Next, the PCVS_VPN Utility sends to PMG_VPN Utility further connection or update info, if necessary, via step 1211 and 1241. The PMG_VPN Utility then receives from PCVS_VPN Utility further connection or update info, if necessary, via step 1201. Next, the PCVS_VPN Utility calls back PMG_VPN Utility to enable a first VPN channel, via steps 1212 and 1242. Then, the PMG_VPN Utility connects to PCVS_VPN Utility to enable a third VPN channel, via step 1202. Next, the PMG_VPN Utility connects to PCVS_VPN Utility to establish a first VPN tunnel from PMG_VPN Utility to PCVS_VPN Utility, via steps 1203 and 1243. Then, the PCVS_VPN Utility establishes a third VPN tunnel from PCVS_VPN Utility to PMG_VPN Utility, via step 1213. Next, the PCVS_VPN Utility waits for a second VPN tunnel on demand to be established from PCVS Device Client to PCVS_VPN Utility, via step 1215. Then, the PCVS_VPN Utility establishes a second VPN tunnel on demand from PCVS Device Client to PCVS_VPN Utility, via steps 1216 and 1246. Next, the PMG_VPN Utility waits for a second VPN tunnel on demand to be established from PCVS Device Client to PCVS_VPN Utility, via step 1205. Then, the PMG_VPN Utility establishes P2P communication channel from PCVS Device Client to PMG_VPN Utility, via steps 1208 and 1248. Then, the PCVS_VPN Utility establishes P2P communication channel from PCVS Device Client to PMG_VPN Utility, via step 1218. After this point, the second VPN tunnel on demand and the third VPN tunnel on demand are channeled into a single VPN tunnel between PCVS Device Client and PMG_VPN Utility. The PCVS Device Client can then start private and secure connection to at least one PMG Device Client, or the PMG Network Service (not shown) on the private PMG LAN, or another PCVS_Device Client (not shown) on the public cloud in the Internet, after the third VPN tunnel on demand and the second VPN tunnel on demand are channeled into a single VPN tunnel between PCVS Device Client and PMG_VPN Utility, via step 1231.

Compared with the third embodiment, the first embodiment has the benefits of a true connection on demand mechanism between the PCVS Device Client and the PCVS VPN Utility via the second VPN tunnel on demand; and between the PCVS VPN Utility and the PMG_VPN Utility, and ultimately to the PMG device clients, via the third VPN tunnel on demand. On the surface, it appears to be more secure than the third embodiment. But due to the commonality of applying the second VPN tunnel on demand, both in the first embodiment and the third embodiment, the final single VPN channel in both embodiments are as secure from the nature of the VPN connection mechanism. The first embodiment can offer a true on demand VPN connection due to its complexity in applying a third VPN tunnel on demand, which is to combine with the second VPN tunnel on demand to channel into a single VPN channel between the PCVS Device Client and the PMG_VPN Utility, and ultimately to the PMG device clients. Its architecture is more complex by utilizing three VPN tunnels, instead of two VPN tunnels in the third embodiment. The first embodiment does not require the third VPN tunnel to be on all the time, or to have to keep it alive all the time. It is therefore consuming less energy in the nature of the on-demand connection mechanism. It may appear that by doing so, it is more secure from the on-demand nature of the third VPN tunnel. But the fact is that the connection mechanism from the second VPN tunnel on demand has more than addressed the security concern in the ultimate single VPN channel between the PCVS Device Client and the PMG_VPN Utility. In terms of connection simplicity, efficiency, and security, the third embodiment is therefore a preferred embodiment.

Figure 13:
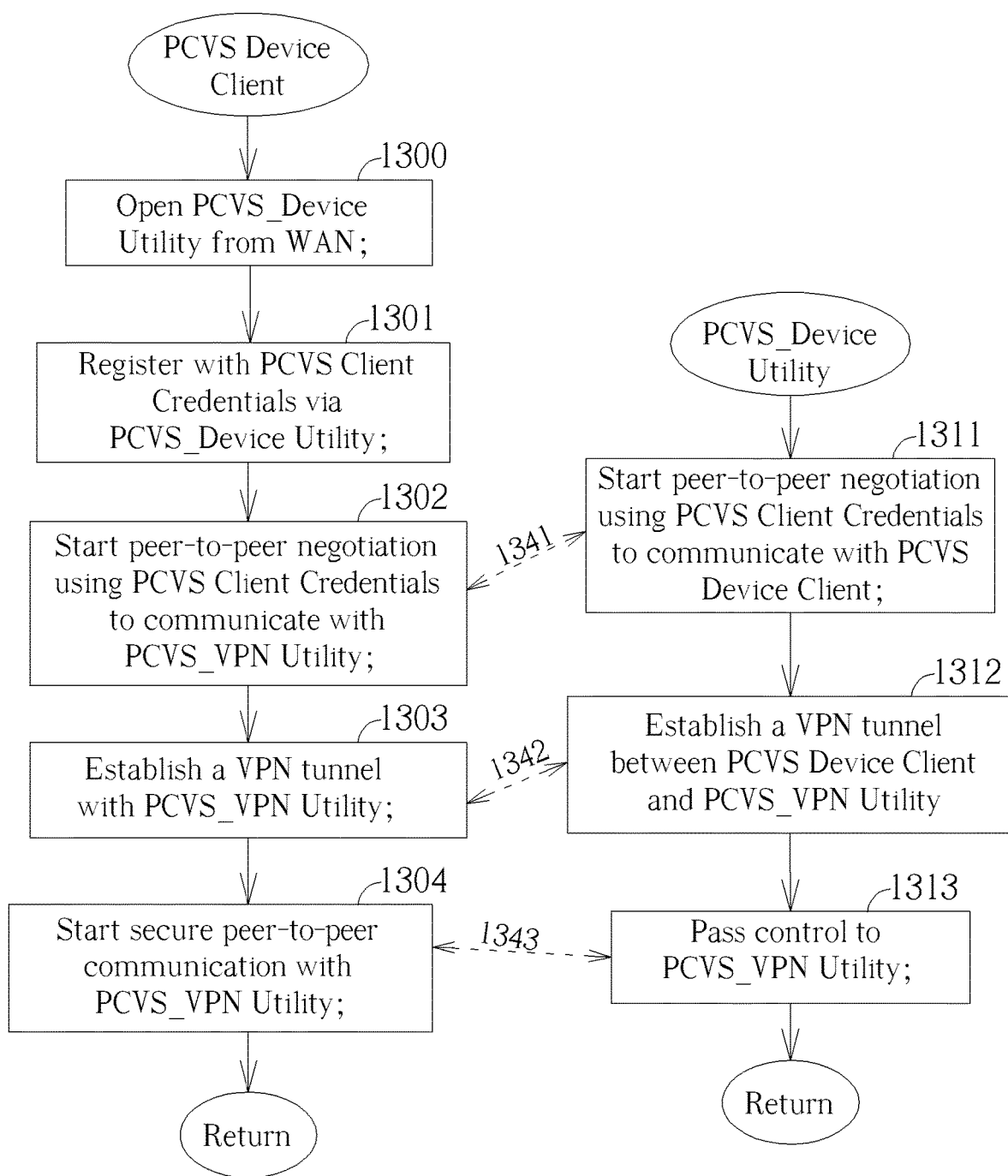
FIG. 13 shows the communication flow of the Private Cloud VPN Server by PCVS Device Client in accordance with the present invention.

FIG. 13 shows the communication flow of the Private Cloud VPN Server by PCVS Device Client in accordance with the present invention. From the PCVS Device Client standpoint, the PCVS_Device Utility is open from the WAN, via step 1300. Next, the PCVS Device Client registers with the PCVS_Device Utility with PCVS Client Credentials including PCVS Client Profile and PCVS Client Login, via step 1301. Next, it starts P2P negotiation using PCVS Client Credentials to communicate with PCVS_VPN Utility, via steps 1302 and 1341. The corresponding PCVS_Device Utility also starts P2P negotiation using PCVS Client Credentials to communicate with PCVS Device Client, via step 1311. Next, a VPN tunnel between PCVS Device Client and the PCVSD_VPN Utility is established, via steps 1303, 1312, and 1342. The PCVS Device Client then starts secure P2P communication with PCVS_VPN Utility, via steps 1304 and 1343. On the side of PCVS_Device Utility, it passes control to PCVS_VPN Utility, via step 1313.

Figure 14:
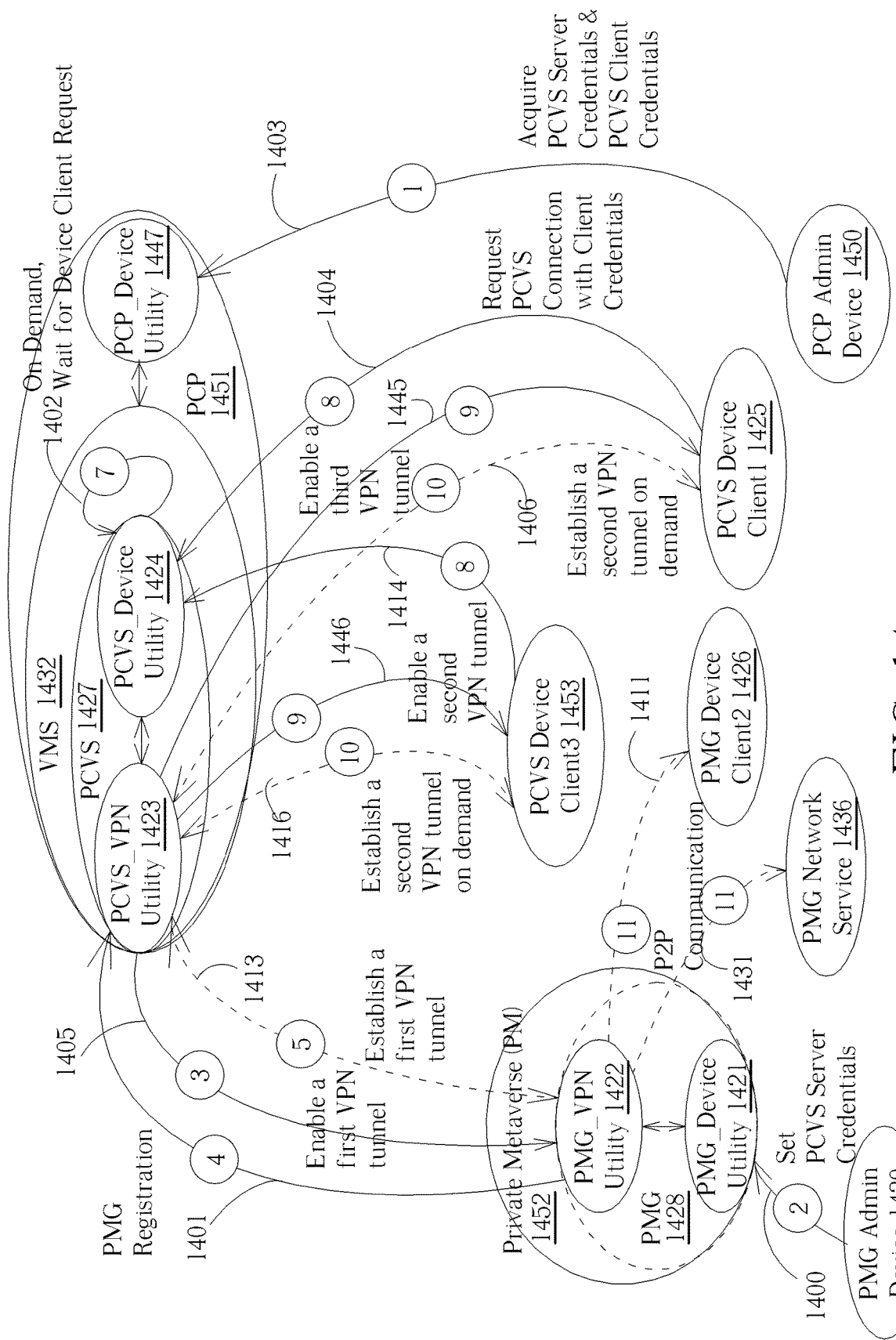
FIG. 14 is a diagram of a third embodiment of a communication flow of P2P Connection Mechanism among PMG, PCVS, PCVS smart device client, and a PMG smart device client through a Cloud Network.

FIG. 14 is a diagram of a communication flow of a third embodiment of P2P Connection Mechanism between PMG, PCVS, a PMG smart device client and a PCVS smart device client through a Cloud Network. It shows in accordance to the present invention that no public cloud Routing Server is required for the PCVS smart device clients to connect and access to either the Server PMG 1428, PCVS 1427, or another PMG smart device client, or the network services under the server through Cloud Network. As shown in FIG. 14, a PCVS Device Client1 1425 and a PMG 1428 on the Cloud Network can communicate with each other without going through the Public Routing Server 112 or the Public VPN Routing Server 114 in FIG. 1. Unlike the prior art in FIG. 7, initially, one of the PCVS_Device Clients, a PCP Admin Device 1450, connects to a PCP 1451, which is a cloud-based public cloud portal, which contains a PCP Device Utility 1447, as in circle 1, 1403. The PCP Admin Device 1450 acquires PCVS Server Credentials as well as PCVS Client Credentials from the PCP_Device Utility 1447. The PCVS Server Credentials include Domain_PCVS, the PCVS server domain, and Passcode_PCVS, the PCVS server passcode. The PCVS Client Credentials include PCVS Client Profile, the client login profile file, and PCVS Client Login, the login password of the client profile. The PCVS Server Credentials are sent to a PMG Admin Device 1420 via email or other means. The PCVS Client Credentials are sent to authorized PCVS Device Clients, such as the PCVS Device Client1 1425, for future P2P connection with one of the PMG Device Clients, such as a PMG Device Client2 1426 on the private LAN of the PMG 1428. The PCP 1451 contains at least one PCP_Device Utility (e.g., the PCP_Device Utility 1447), which in turn contains at least one VMS (e.g., a VMS 1432), which in turn contains at least one PCVS (e.g., a PCVS 1427), which in turn contains a PCVS_Device Utility 1424 and a PCVS_VPN Utility 1423. The VMS 1432 along with the PCVS 1427 forms a one-to-one corresponding relationship with the PMG 1428, deployed in the private LAN. The PCP_Device Utility 1447 is a public cloud portal which is scalable and may correspond to the at least one VMS (e.g., the VMS 1432) and the at least one PCVS (e.g., the PCVS 1427).

The PMG Admin Device 1420, after receiving the PCVS Server Credentials, first initializes and provisions the PMG 1428 with the server credentials through a PMG_Device Utility 1421, as described in circle 2, 1400. The PMG_Device Utility 1421 then passes the info internally inside the PMG 1428, to a PMG_VPN Utility 1422. It then registers to the PCVS_VPN Utility 1423 with the PCVS Server credentials info that includes the Domain_PCVS and Passcode_PCVS through the TCP/UDP protocols, as in circle 4, 1401. The PCVS_VPN Utility 1423 then calls back to a PM 1452, which contains at least one PMG (e.g., the PMG 1428), which in turn contains the PMG_VPN Utility 1422 to enable a first VPN channel between the PCVS_VPN Utility 1423 and the PMG_VPN Utility 1422, as in circle 3, 1405. Afterwards, the PMG_VPN Utility 1422 establishes a first VPN tunnel between the PMG_VPN Utility 1422 and the PCVS_VPN Utility 1423, as in circle 5, 1413. The PCVS_VPN Utility 1423 also enables a second VPN channel between the PCVS_VPN Utility 1423 and any PCVS_Device Client (e.g., the PCVS Device Client1 1425 or a CVS Device Client3 1453), as in circle 9, 1445 or 1446, from the cloud in the Internet. The PCVS 1427 is then ready for further action on demand from any PCVS Device Client (e.g., the PCVS Device Client1 1425) from the cloud in the Internet. The PCVS_VPN Utility 1423 communicates with the PCVS_Device Utility 1424, internally inside the PCVS 1427. The PCVS_Device Utility 1424 stays in a loop waiting on demand for the PCVS smart device client request, as circle 7, 1402. The PCVS Device Client1 1425 first registers to the PCVS_Device Utility 1424, with the PCVS Client Credentials, including the PCVS Client Profile and PCVS Client Login, as in circle 8, 1404 or 1414. The PCVS_Device Utility 1424 passes the PCVS Client Credentials and the connection request internally inside the PCVS 1427, to the PCVS_VPN Utility 1423. After registration, the PCVS Device Client1 1425 connects to the PCVS_VPN Utility 1423 and establishes a second VPN tunnel on demand between the PCVS Device Client1 1425 and the PCVS_VPN Utility 1423, as in circle 10, 1406 or 1416. The second VPN tunnel on demand as in circle 10, 1406 and the first VPN tunnel as in circle 5, 1413 are channeled into a single VPN between the PCVS Device Client1 1425 and the PMG_VPN Utility 1422 and in turn connecting to a PMG Device Client2 1426, as in circle 11, 1411, or a PMG Network Service 1436 as in circle 11, 1431, or yet another PCVS Device Client (e.g., the PCVS Device Client3 1453) as in circle 10, 1416, assuming another PCVS Device Client (e.g., the PCVS Device Client3 1453) has also successfully connected to the PCVS_VPN Utility 1423. The PCVS Device Client1 1425 and the PCVS Device Client3 1453 therefore form a P2P private and secure communication channel between them, which is the foundation for further secure chat applications in text, audio, and video, including crypto currency transaction.

Compared with the prior art in FIGS. 6 and 7, the present invention is more scalable and expandable, as it introduces a few new entities, including the PCP 1451, the PCP_Device Utility 1447, the VMS 1432, the PM 1452, the PCP Admin Devices 1450, the PMG Admin Device 1420, the PCVS Server Credentials, and the PCVS Client Credentials. It connects first to the PCP 1451, then to at least one PCP_Device Utility (e.g., the PCP Device Utility 1447), then to the at least one VMS (e.g., the VMS 1432), then to the at least one PCVS (e.g., the PCVS 1427), then to at least one PM (e.g., the PM 1452), then to the at least one PMG (e.g., the PMG 1428), then to at least one PMG Device Client (e.g., the PMG Device Client2 1426), or to at least one PMG Network Service (e.g., the PMG Network Service 1436), or to yet another PCVS Device Client (e.g., the PCVS Device Client3 1453). The PCP Admin Device 1450 starts with acquiring the PCVS Server Credentials and Client Credentials from the PCP 1451. Afterwards, the PCVS Server Credentials are sent to the PMG Admin Device 1420 to set to the PMG 1428 for connection with the corresponding PCVS 1427, which is inside the VMS 1432, which is inside the PCP 1451. Further, there are at least three VPN tunnels binding together before the final two VPN tunnels forming a single VPN tunnel for the peer-to-peer communication between a PCVS smart device client 1425 and a PMG smart device client 1426, the PMG Network Service 1436, or yet another PCVS smart device client (e.g., the PCVS Device Client3 1453) in a vertical P2P private and secure PCVS smart device client application.

Figure 15:
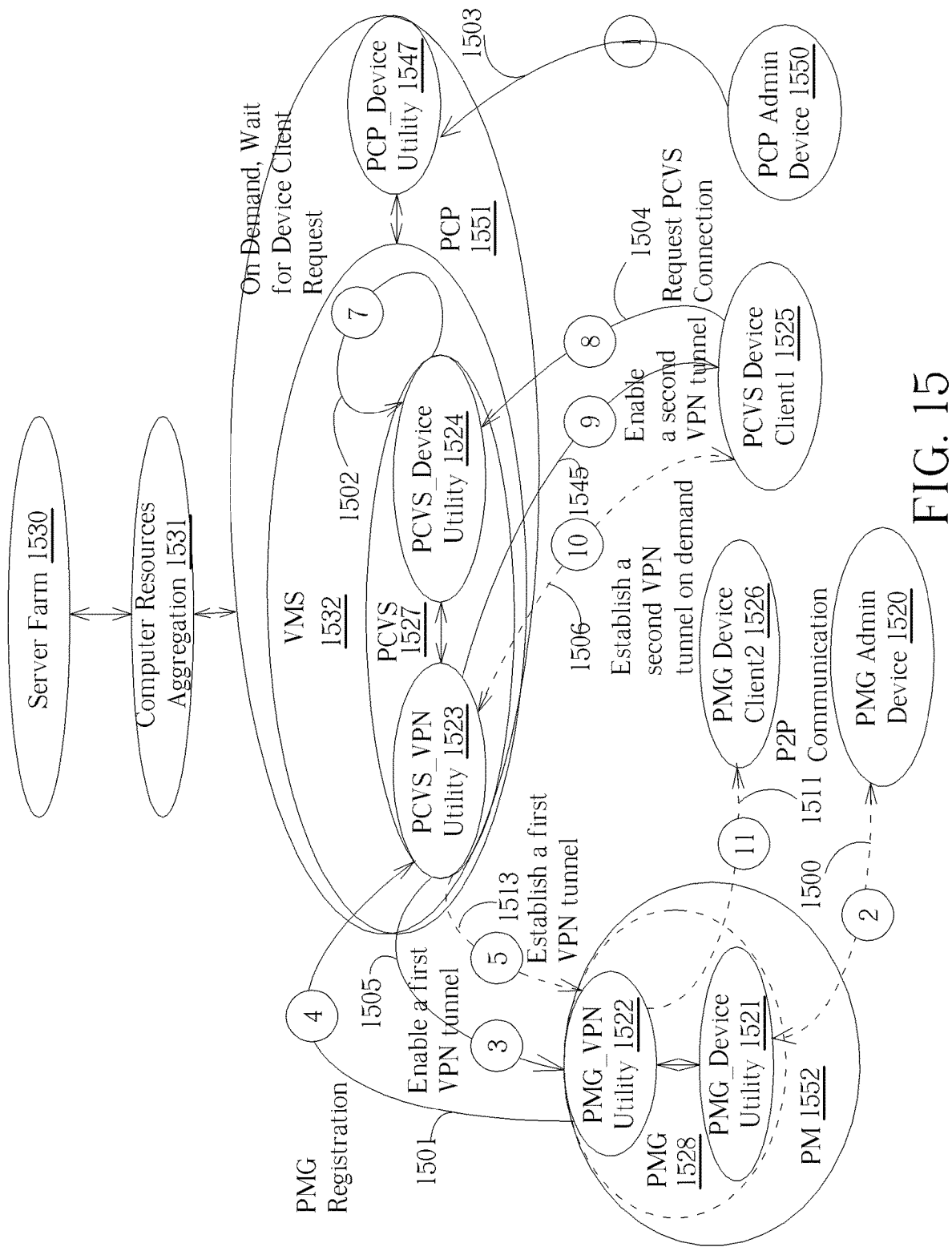
FIG. 15 is a diagram of a third embodiment of a communication flow of P2P Connection Mechanism among PMG, PCVS, PCVS smart device client, and a PMG smart device client through a Cloud Network based on server farm, computer resources aggregation and virtual machine server.

FIG. 15 is a diagram of a communication flow of a third embodiment of P2P Connection Mechanism between PMG, PCVS, a PMG smart device client and a PCVS smart device client through a Cloud Network based on server farm, computer resources aggregation and virtual machine server. Further, FIG. 15 expands upon FIG. 14 by adding a server farm 1530 and a computer resources aggregation 1531 to exemplify the implementation of the PMG connection mechanism in a hyperscale data center. The hyperscale data center may have at least one server farm (e.g., the server farm 1530), at least one computer resources aggregation (e.g., the computer resources aggregation 1531), at least one PCP (e.g., a PCP 1551), and at least one VMS (e.g., a VMS 1532). The VMS 1532 is scalable in quantity and size. The hyperscale datacenter or the service provider may construct and deploy at least one PCP (e.g., a PCP 1551) and a large number of independent PCVS (e.g., a PCVS 1527) in its corresponding VMSs (e.g., the VMS 1532) in order to service its corresponding PMG (e.g., a PMG 1528) and the corresponding PMG smart device clients (e.g., a PMG Device Client2 1526). In essence, a community pair of P2P communication relationship between the PCVS smart device client (e.g., a PCVS Device Client1 1525) and the PMG smart device client (e.g., the PMG Device Client2 1526) may be constructed and deployed by the platform owner who is responsible for maintaining the VMS 1532 with or without the topology of the computer resources aggregation 1531 and the server farm 1530. A possible business model, for example, is for an Internet platform owner to offer to a large number of subscribers to host their private and secure PCVS 1527 in the VMS 1532. In addition, a separate private and secure PMG 1528 is also offered to allow the individual subscriber to install the PMG 1528 in their private LAN. Through the invention, the platform subscriber may establish from anywhere, a P2P communication between its PCVS smart device client (e.g., the PCVS Device Client1 1525), such as a smart phone, a tablet or a Tesla dashboard, and a PMG smart device client e.g., the PMG Device Client2 1526), such as a NB, IoT device, NAS, STB, smart appliance, or media server, residing on the subscriber's private and secure LAN. FIG. 15 shows in accordance with the present invention that no public cloud Routing Server is required for the PCVS smart device clients (e.g., the PCVS Device Client1 1525) to connect and access to either the Server PMG 1528, PCVS 1527, or another PMG smart device client (e.g., the PMG Device Client2 1526), or the network services (not shown) under the server through the Cloud Network. As shown in FIG. 15, the PCVS Device Client1 1525 and the PMG 1528 on the Cloud Network may communicate with each other without going through the Public Routing Server 112 or the Public VPN Routing Server 114 in FIG. 1 (not shown). Initially, one of the PCVS_Device Clients, a PCP Admin Device 1550, connects to the PCP 1551, which is a cloud-based public cloud portal, which contains a PCP Device Utility 1547, as in circle 1, 1503. The PCP Admin Device 1550 acquires PCVS Server Credentials as well as PCVS Client Credentials from the PCP_Device Utility 1547. The PCVS Server Credentials include Domain_PCVS, the PCVS server domain, and Passcode_PCVS, the PCVS server passcode. The PCVS Client Credentials include PCVS Client Profile, the client login profile file, and PCVS Client Login, the login password of the client profile. The PCVS Server Credentials are sent to a PMG Admin Device 1520 via email or other means. The PCVS Client Credentials are sent to authorized PCVS Device Clients, such as the PCVS Device Client1 1525, for future P2P connection with one of the PMG Device Clients, such as the PMG Device Client2 1520 on the private LAN of the PMG 1528. The PCP 1551 contains at least one PCP Device Utility (e.g., a PCP_Device Utility 1547), which in turn contains the at least one VMS (e.g., the VMS 1532), which in turn contains at least one PCVS (e.g., the PCVS 1527), which in turn contains a PCVS_Device Utility 1524 and a PCVS_VPN Utility 1523. The VMS 1532 along with the PCVS 1527 forms a one-to-one corresponding relationship with the PMG 1528, deployed in the private LAN. The PCP_Device Utility 1547 is a public cloud portal which is scalable and may correspond to the at least one VMS (e.g., the VMS 1532) and the at least one PCVS (e.g., the PCVS 1527).

The PMG Admin Device 1520, after receiving the PCVS Server Credentials, first initializes and provisions the PMG 1528 with the server credentials through the PMG_Device Utility 1521, as described in circle 2, 1500. The PMG_Device Utility 1521 then passes the info internally inside the PMG 1528, to a PMG_VPN Utility 1522. It then registers to the PCVS_VPN Utility 1523 with the PCVS Server credentials info that includes the Domain_PCVS and Passcode_PCVS through the TCP/UDP protocols, as in circle 4, 1501. After registration, the PCVS_VPN Utility 1523 then calls back to a PM 1552, which contains at least one PMG (e.g., the PMG 1528), which in turn contains the PMG_VPN Utility 1522 to enable a first VPN channel between the PCVS_VPN Utility 1523 and the PMG_VPN Utility 1522, as in circle 3, 1505. The PCVS_VPN Utility 1523 can also establish a second VPN tunnel on demand between the PCVS_VPN Utility 1523 and the PMG_VPN Utility 1522, pending the completion in establishing a second VPN tunnel on demand, as in circle 10, 1506. Afterwards, the PMG_VPN Utility 1522 establishes a first VPN tunnel between the PMG_VPN Utility 1522 and the PCVS_VPN Utility 1523, as in circle 5, 1513. The PCVS_VPN Utility 1523 also enables a second VPN channel between the PCVS_VPN Utility 1523 and any PCVS Device Client (e.g., the PCVS_Device Client1 1525), as in circle 9, 1545, from the cloud in the Internet. The PCVS 1527 is then ready for further action on demand from any PCVS Device Client (e.g., the PCVS Device Client1 1525) from the cloud in the Internet. The PCVS_VPN Utility 1523 communicates with the PCVS_Device Utility 1524, internally inside the PCVS 1527. The PCVS_Device Utility stays in a loop waiting on demand for the PCVS smart device client request, as circle 7, 1502. The PCVS Device Client1 1525 first registers to the PCVS_Device Utility 1524, with the PCVS Client Credentials, including the PCVS Client Profile and PCVS Client Login, as in circle 8, 1504. The PCVS_Device Utility 1524 passes the PCVS Client Credentials and the connection request internally inside the PCVS 1527, to the PCVS_VPN Utility 1523. After registration, the PCVS_Device Client1 1525 connects to the PCVS_VPN Utility 1523 and establishes a second VPN tunnel on demand between the PCVS Device Client1 1525 and the PCVS_VPN Utility 1523, as in circle 10, 1506. The second VPN tunnel on demand as in circle 10, 1506 and the first VPN tunnel as in circle 5, 1513 are channeled into a single VPN between the PCVS_Device Client1 1525 and the PMG_VPN Utility 1522 and in turn connecting to the PMG Device Client2 1526, as in circle 11, 1511, or a PMG Network Service (not shown) as in circle 11, 1511.

Figure 16:
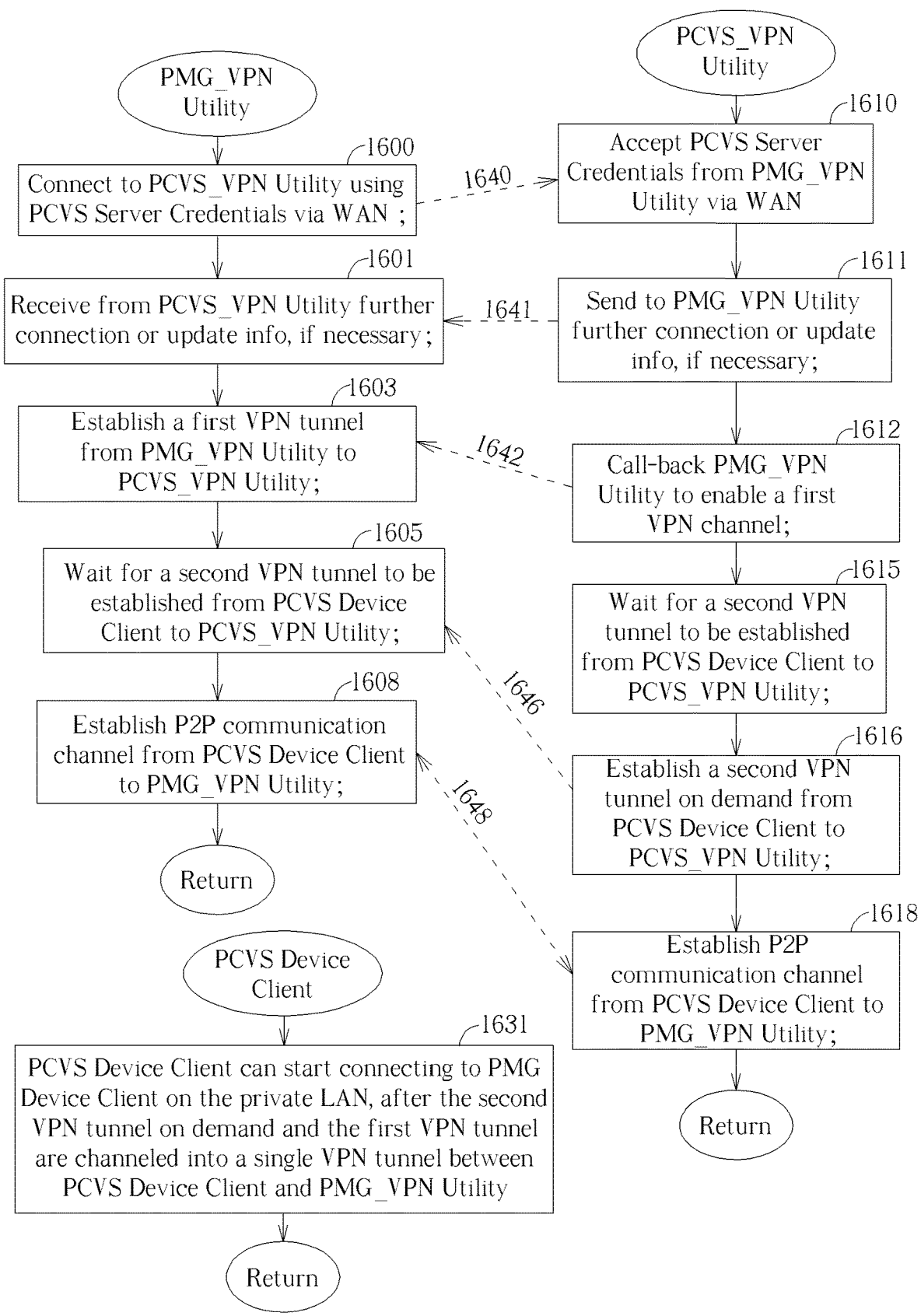
FIG. 16 shows the communication flow of a third embodiment of Connection from the PCVS_VPN Utility to the PMG_VPN Utility and the connection between a PCVS Device Client and a PMG Device Client on a private LAN in accordance with the present invention.

FIG. 16 shows the communication flow of a third embodiment of Connection from the PCVS_VPN Utility to the PMG_VPN Utility and the connection between a PCVS Device Client and a PMG Device Client on a private LAN in accordance with the present invention. The PMG_VPN Utility first connects to PCVS_VPN Utility using PCVS Server Credentials via WAN, via step 1600. The PCVS_VPN Utility accepts PCVS Server Credentials from PMG_VPN Utility via WAN, via step 1610. Next, the PCVS_VPN Utility sends to PMG_VPN Utility further connection or update info, if necessary, via steps 1611 and 1641. The PMG_VPN Utility then receives from PCVS_VPN Utility further connection or update info, if necessary, via step 1601. Next, the PCVS_VPN Utility calls back PMG_VPN Utility to enable a first VPN channel, via steps 1612 and 1642. Next, the PMG_VPN Utility connects to PCVS_VPN Utility to establish a first VPN tunnel from PMG_VPN Utility to PCVS_VPN Utility, via steps 1603 and 1642. Next, the PCVS_VPN Utility waits for the second VPN tunnel to be established from PCVS Device Client to PCVS_VPN Utility, via step 1615. Then, the PCVS_VPN Utility establishes a second VPN tunnel on demand from PCVS Device Client to PCVS_VPN Utility, via steps 1616 and 1646. Next, the PMG_VPN Utility waits for the second VPN tunnel to be established from PCVS Device Client to PCVS_VPN Utility, via step 1605. Then, the PMG_VPN Utility establishes P2P communication channel from PCVS Device Client to PMG_VPN Utility, via step 1608, 1618 and 1648. After this point, the second VPN tunnel and the first VPN tunnel are channeled into a single VPN tunnel between PCVS Device Client and PMG_VPN Utility. The PCVS Device Client can then start private and secure connection to at least one PMG Device Client, or the PMG Network Service (not shown) on the private PMG LAN, or another PCVS_Device Client (not shown) on the public cloud in the Internet, after the second VPN tunnel on demand and the first VPN tunnel are channeled into a single VPN tunnel between PCVS Device Client and PMG_VPN Utility, via step 1631, Compared with the first embodiment, the third embodiment has the benefits of a simpler architecture by utilizing only two VPN tunnels, instead of three VPN tunnels from the first embodiment. But the third embodiment requires the first VPN tunnel to be on all the time, or at least to have to keep alive all the time. It may appear that by doing so, it is less secure from the always-on nature of the first VPN tunnel. But the fact is that the connection mechanism from the second VPN tunnel on demand has more than addressed the security concern in the ultimate single VPN channel between PCVS Device Client and PMG_VPN Utility. In terms of connection simplicity, efficiency, and security, the third embodiment is therefore a preferred embodiment.

Most of the content providers, such as Netflix, HBO, Amazon, Pandora, and others, enforce a mechanism called geo-blocking to enforce their exclusive digital territorial rights. In contrast, geo-home is a mechanism for allowing access to the online content at home, while geo-portal is a mechanism for allowing access to the online content at the portal. Although the legality of the enforcement of geo-blocking is controversial and is interpreted differently from regions to regions, some of the international travelers employ VPN relay services to circumvent IP-based geo-blocks, in order to access home or foreign based online content that are not available from outside the country they are in. The downside of this practice, other than legality, is that it involves additional subscription to the VPN service and the limited selections by choosing either geo-home or geo-portal. The present invention provides a mechanism for the platform owner to dynamically configure PCVS on demand to flexibly offer to the users on the choices among geo-blocking, geo-portal, or geo-home in accessing the on-line content, in addition to the original features in allowing the private and secure access to the PMG device clients and network services in the private LAN from anywhere in the cloud through Internet.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a connection mechanism in a public cloud network, the method comprising:
    setting up at least one public cloud portal (PCP), at least one virtual machine server (VMS), at least one PCP Admin Device, at least one private cloud virtual private network (VPN) server (PCVS), at least one VPN tunnel, and at least one PCVS smart device client on a side of the at least one PCVS to provide a plurality of cloud-based web services, at least one private metaverse (PM) which includes at least one private router, at least one private local area network (LAN), at least one private matter gateway (PMG), at least one PMG Admin Device, at least one PMG network service, and at least one PMG smart device client on a side of a PMG private LAN in a client server relationship;
    acquiring a plurality of connection credentials from a PCP Admin Device of the at least one PCP Admin Device;
    pairing and registration with a PCVS of the at least one PCVS from a PMG of the at least one PMG;
    establishing a plurality of initial VPN tunnels between the PCVS and the PMG;
    connecting to the PMG on demand between a PCVS smart device client of the at least one PCVS smart device client and the PMG through the PCVS; and
    running a plurality of vertical peer-to-peer (P2P) private and secure PCVS smart device client applications between the at least one PCVS smart device client and one of the at least one PMG smart device client, the at least one PMG network service and another PCVS smart device client;
    wherein the connection mechanism is a P2P private and secure connection mechanism between the at least one PCVS smart device client and at least one of the PMG, the at least one PMG smart device client, the at least one PMG network service or the another PCVS smart device client;
    wherein the at least one PCP and the at least one VMS which includes the at least one PCVS reside in a hyperscale data center located on the public cloud network;
    wherein the at least one PM along with the at least one PMG reside in a plurality of client's remote premises;
    wherein the PCVS smart device client functions as a Virtual Teleporter and is virtually teleported to a private LAN where the at least one PMG smart device client resides.

2. The method of claim 1, wherein the plurality of connection credentials include a plurality of plurality of PCVS server credentials and a plurality of PCVS client credentials.

3. The method of claim 2, wherein the at least one PCP is accessed by the at least one PCP Admin Device to log in and acquire the plurality of PCVS server credentials and the plurality of PCVS client credentials.

4. The method of claim 2, wherein the plurality of PCVS server credentials are sent to a PMG Admin Device of the at least one PMG Admin Device, and the plurality of PCVS client credentials are sent to the PCVS smart device client for a connection.

5. The method of claim 2, wherein the plurality of PCVS server credentials include a PCVS virtual machine server domain name and a PCVS virtual machine server login passcode, and the plurality of PCVS client credentials include a PCVS smart device client VPN profile file and a PCVS smart device client VPN login password.

6. The method of claim 2, wherein the plurality of PCVS server credentials are imported by a PMG Admin Device of the at least one PMG Admin Device to set into the PMG in order for the PMG to pair and register with the PCVS.

7. The method of claim 1, wherein the step of establishing the plurality of initial VPN tunnels between the PCVS and the PMG comprises:
    calling back, by the at least one PCVS in the public cloud network, the at least one PMG in a private LAN of the at least one PM to enable a first VPN channel;
    establishing, by the at least one PMG, a first VPN tunnel with the at least one PCVS, if the first VPN channel is enabled by the PCVS;
    enabling, by the at least one PMG, a third VPN channel with the at least one PCVS, if a plurality of proper credentials are established;
    establishing, by the PCVS, a third VPN tunnel on demand between the PCVS and the PMG, pending a completion in establishing a second VPN tunnel on demand between the PCVS smart device client and the PCVS;
    enabling, by the PCVS, a second VPN channel on demand between the PCVS and the at least one PCVS smart device client from a cloud in an Internet; and
    establishing, by the at least one PCVS smart device client, the second VPN tunnel on demand between the PCVS and the at least one PCVS smart device client;
    wherein the second VPN tunnel on demand and the third VPN tunnel on demand are channeled into a single VPN tunnel between the PCVS smart device client and the PMG through the PCVS, and ultimately to the at least one PMG smart device client, the at least one PMG network service and the another PCVS smart device client.

8. The method of claim 1, wherein the step of establishing the plurality of initial VPN tunnels between the PCVS and the PMG comprises:

calling back, by the at least one PCVS in the public cloud network, the at least one PMG in a private LAN of the at least one PM to enable a first VPN channel;

establishing, by the at least one PMG, a first VPN tunnel with the at least one PCVS, if the first VPN channel is enabled by the PCVS;

enabling, by the PCVS, a second VPN channel on demand between the PCVS and at least one PCVS smart device client from a cloud in an Internet; and establishing, by the at least one PCVS smart device client, the second VPN tunnel on demand between the PCVS and the at least one PCVS smart device client;

wherein the first VPN tunnel and the second VPN tunnel on demand are channeled into a single VPN tunnel between the PCVS smart device client and the PMG through the PCVS, and ultimately to the at least one PMG smart device client, the at least one PMG network service and the another PCVS smart device client.

9. The method of claim 1, wherein the step of connecting to the PMG on demand between the PCVS smart device client and the PMG through the PCVS comprises:

starting, by the at least one PCVS smart device client, request for a connection to the at least one PCVS through a PCVS VPN client profile to establish a second VPN tunnel on demand, in case that the at least one PCVS smart device client intends to access to the at least one PMG smart device client or a private network service (PNS) on a private LAN of the at least one PM.

10. The method of claim 1, wherein the step of running the plurality of vertical P2P private and secure PCVS smart device client applications between the at least one PCVS smart device client and the one of the at least one PMG smart device client, the at least one PMG network service and the another PCVS smart device client comprises:

joining, by the PCVS smart device client in the public cloud network, a private and secure communication session as a guest with a host PCVS smart device client;

wherein the PCVS smart device client is available for access in a LAN mode for a VPN connection from the at least one PCVS smart device client;

wherein the private and secure communication session includes at least one of a video, an audio, a text or an application, and the application includes a program, an utility, an operation or a transaction that is recognizable by the PCVS smart device client and the host PCVS smart device client;

wherein the at least one PMG smart device client along with the at least one PMG network service on a private LAN of the at least one PMG are available for access in the LAN mode for the VPN connection from the at least one PCVS smart device client;

wherein through a Virtual Teleporter effect, a plurality of usage models are available: (A) Access to home from anywhere (ATHFA); (B) Work from home from anywhere (WFHFA); (C) Chat in home from anywhere (CIHFA); and (D) Barter at home from anywhere (BAHFA);

wherein through the Virtual Teleporter effect, a plurality of Internet platforms are unified together into a single unified platform, allowing platform agnostic access with the plurality of usage models;

wherein a private and secure communication session content is not trackable nor monitorable by another third party due to a VPN connection mechanism between the PCVS smart device client and the at least one PMG smart device client.

11. The method of claim 10, wherein the application is a crypto currency application including a program, an utility, or a transaction that is recognizable by the at least one PCVS smart device client and the another PCVS smart device client, when the plurality of vertical P2P private and secure PCVS smart device client applications between the at least one PCVS smart device client and the another PCVS smart device client is run.

12. The method of claim 10, wherein the PCVS is configured on demand to offer the plurality of choices among geo-blocking, geo-portal, or geo-home in accessing an on-line content, when the plurality of vertical P2P private and secure PCVS smart device client applications between the at least one PCVS smart device client and the another PCVS smart device client is run.

13. The method of claim 1, wherein the at least one PCP comprises:

an Internet service; and a program that executes instructions stored in memory to instruct the at least one PCP to:

create and manage an authorized client list to accommodate the at least one PCP Admin Device;

create and manage the plurality of connection credentials including a plurality of PCVS server credentials and a plurality of PCVS client credentials; and conduct the step of acquiring the plurality of connection credentials from the PCP Admin Device.

14. The method of claim 1, wherein the at least one VMS comprises:

an Internet service; and a program that executes instructions stored in memory to instruct the at least one VMS to:

create and manage an authorized client list to accommodate the at least one PCP Admin Device, the at least one PMG, and the at least one PCVS; and manage a communication between the PCVS and the PCVS smart device client.

15. The method of claim 1, wherein the at least one PCP Admin device comprises:

a computing device;

a connection to a network; and a program that executes instructions stored in memory to instruct the at least one PCP Admin Device to:

establish a first network service running in a LAN mode;

establish a second network service based on Internet protocol;

establish a third network service based on an industry standard network protocol; and conduct the step of acquiring the connection credentials from the PCP Admin Device.

16. The method of claim 1, wherein the at least one PCVS comprises:

a computing device;

a connection to a network; and a program that executes instructions stored in memory to instruct the at least one PCVS to:

create and manage a first authorized client list to accommodate the at least one PCVS smart device client through at least one VPN connection;

create and manage a second authorized client list to accommodate the at least one PMG through the at least one VPN connection;

conduct the step of pairing and registration with the PCVS from the PMG;

conduct the step of establishing the plurality of initial VPN tunnels between the PCVS and the PMG; and conduct the step of connecting to the PMG on demand between the PCVS smart device client and the PMG through the PCVS.

17. The method of claim 1, wherein the at least one PCVS smart device client comprises:
a computing device;
a connection to a network; and
a program that executes instructions stored in memory to instruct the PCVS smart device client to:
establish a first network service based on Internet protocol;
establish a second network service based on an industry standard network protocol;
create and manage an Internet connection with the at least one VMS and the at least one PCVS through an VPN connection;
create and manage a connection with the at least one PMG smart device client through the VPN connection;
conduct the step of connecting to the PMG on demand between the PCVS smart device client and the PMG through the PCVS; and
conduct the step of running the plurality of vertical P2P private and secure PCVS smart device client applications between the at least one PCVS smart device client and the one of the at least one PMG smart device client, the at least one PMG network service and the another PCVS smart device client.

18. The method of claim 1, wherein the at least one PM comprises:
an Internet router;
at least one private LAN;
at least one private network service;
the at least one PMG smart device client; and
the at least one PMG.

19. The method of claim 1, wherein the at least one PMG comprises:
a computing device;
a connection to a network; and
a program that executes instructions stored in memory to instruct the at least one PMG to:
create and manage an authorized client list to accommodate the at least one PCVS through a VPN connection;
conduct the step of pairing and registration with the PCVS from the PMG;
conduct the step of establishing the plurality of initial VPN tunnels between the PCVS and the PMG;
conduct the step of connecting to the PMG on demand between the PCVS smart device client and the PMG through the PCVS; and
conduct the step of running the plurality of vertical P2P private and secure PCVS smart device client applications between the at least one PCVS smart device client and the one of the at least one PMG smart device client, the at least one PMG network service and the another PCVS smart device client.

20. The method of claim 1, wherein the at least one PMG network service comprises:
a first network service running in a LAN mode to avoid monitoring or recording due to a strength of an industry recognized VPN tunnel;
a second network service based on Internet protocol;
a third network service based on an industry standard network protocol;
a fourth network service that is platform agnostic and simultaneously compatible with all existing fragmented IoT device; and
a fifth network service based on the step of connecting to the PMG on demand between the PCVS smart device client and the PMG through the PCVS.

21. The method of claim 1, wherein the at least one PMG smart device client comprises:
a computing device;
a connection to a network; and
a program that executes instructions stored in memory to instruct the at least one PMG smart device client to:
establish a first network service running in a LAN mode;
establish a second network service based on Internet protocol;
establish a third network service based on an industry standard network protocol;
conduct the step of connecting to the PMG on demand between the PCVS smart device client and the PMG through the PCVS; and
conduct the step of running the plurality of vertical P2P private and secure PCVS smart device client applications between the at least one PCVS smart device client and the at least one PMG smart device client.

22. The method of claim 1, wherein the at least one PMG Admin device comprises:
a computing device;
a connection to a network; and
a program that executes instructions stored in memory to instruct the at least one PMG Admin Device to:
establish a first network service running in a LAN mode;
establish a second network service based on Internet protocol;
establish a third network service based on an industry standard network protocol; and
conduct the step of pairing and registration with the PCVS from the PMG.

23. The method of claim 1, wherein the at least one VPN tunnel comprises:
at least one first network service based on Internet protocol;
at least one second network service based on an industry standard network protocol;
a privacy and a security, as well as a future proof interoperability and compatibility in a communication;
a LAN mode access through the at least one VPN tunnel;
at least one first VPN tunnel of the plurality of initial VPN tunnels between the PCVS and the PMG, and
at least one second VPN tunnel between the PCVS smart device client and the PMG through the PCVS.

* * * * *